(12) United States Patent
Lussier et al.

(10) Patent No.: US 10,077,089 B1
(45) Date of Patent: *Sep. 18, 2018

(54) ENDLESS TRACK FOR TRACTION OF A VEHICLE

(71) Applicant: Camso Inc., Magog (CA)

(72) Inventors: Alain Lussier, St-Francois Xavier de Brompton (CA); Francois Leblanc, Magog (CA); Patrice Boily, St-Catherine-de-Hatley (CA)

(73) Assignee: Camso Inc., Magog (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/721,326

(22) Filed: May 26, 2015

Related U.S. Application Data

(63) Continuation of application No. 13/325,783, filed on Dec. 14, 2011, now Pat. No. 9,067,631.
(Continued)

(51) Int. Cl.
*B62D 55/24* (2006.01)

(52) U.S. Cl.
CPC .................. *B62D 55/244* (2013.01)

(58) Field of Classification Search
CPC ..... B62D 55/24; B62D 55/244; B62D 55/253
(Continued)

(56) References Cited

U.S. PATENT DOCUMENTS

| 2,369,130 A | 2/1945 | Benson |
| 2,562,264 A | 7/1951 | Ford |

(Continued)

FOREIGN PATENT DOCUMENTS

| CA | 2475845 A1 * | 1/1994 |
| DE | 20207342 | 9/2002 |

(Continued)

OTHER PUBLICATIONS

Non-Final Office Action issued by the USPTO dated Mar. 6, 2015 in connection with U.S. Appl. No. 13/326,278, 31 pages.
(Continued)

*Primary Examiner* — Kip T Kotter
(74) *Attorney, Agent, or Firm* — Fish & Richardson P.C.

(57) ABSTRACT

An endless track for traction of an off-road vehicle, such as an agricultural vehicle, an industrial vehicle (e.g., a construction vehicle) or a military vehicle, is provided. The endless track comprises an elastomeric belt-shaped body comprising an inner surface for facing wheels of the vehicle and a ground-engaging outer surface for engaging the ground. The endless track also comprises a plurality of elastomeric lugs, such as drive/guide lugs projecting from the inner surface and/or traction lugs projecting from the ground-engaging outer surface. An elastomeric lug may have a material composition defining an arrangement of zones of different materials which comprises a plurality of zones of different elastomeric materials. The elastomeric lug may exhibit a desired variation of a material property (e.g., a modulus of elasticity) across the arrangement of zones of different materials. A zone of the elastomeric lug may have a dedicated function, such as a sacrificial zone or a wear indicator zone. An elastomeric drive lug may comprise an uneven drive surface, such as an angled or curved surface, for engaging a drive member of a drive wheel of the vehicle.

31 Claims, 28 Drawing Sheets

Related U.S. Application Data

(60) Provisional application No. 61/422,968, filed on Dec. 14, 2010.

(58) Field of Classification Search
USPC .......... 305/165, 166, 167, 173, 174, 175
See application file for complete search history.

(56) References Cited

U.S. PATENT DOCUMENTS

| | | |
|---|---|---|
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,612,626 A | 10/1971 | Fuchs |
| 3,767,275 A | 10/1973 | Russ, Sr. |
| 3,781,067 A | 12/1973 | Dodson et al. |
| 4,150,858 A | 4/1979 | Fox et al. |
| 4,279,449 A | 7/1981 | Martin et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,721,498 A | 1/1988 | Grob |
| 4,843,114 A | 6/1989 | Touchet et al. |
| 4,844,561 A | 7/1989 | Savage et al. |
| 4,880,283 A | 11/1989 | Savage et al. |
| 4,953,921 A | 9/1990 | Burns |
| 5,145,242 A | 9/1992 | Togashi |
| 5,320,585 A | 6/1994 | Kato |
| 5,352,029 A | 10/1994 | Nagorcka |
| 5,362,142 A | 11/1994 | Katoh |
| 5,380,076 A | 1/1995 | Hori |
| 5,447,365 A | 9/1995 | Muramatsu et al. |
| 5,511,869 A | 4/1996 | Edwards et al. |
| 5,513,683 A | 5/1996 | Causa et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,984,438 A | 11/1999 | Tsunoda et al. |
| 6,000,766 A | 12/1999 | Takeuchi et al. |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,129,426 A | 10/2000 | Tucker |
| 6,139,121 A | 10/2000 | Muramatsu |
| 6,153,686 A | 11/2000 | Granatowicz et al. |
| 6,176,557 B1 | 1/2001 | Ono |
| 6,193,335 B1 | 2/2001 | Edwards |
| 6,296,329 B1 | 10/2001 | Rodgers et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,474,756 B2 | 11/2002 | Hori et al. |
| 6,536,852 B2 | 3/2003 | Katayama et al. |
| 6,588,862 B1 | 7/2003 | Pringiers |
| 6,698,850 B2 | 3/2004 | Ueno |
| 6,716,012 B2 | 4/2004 | Yovichin et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,913,329 B1 | 7/2005 | Rodgers et al. |
| 6,932,442 B2 | 8/2005 | Hori |
| 6,964,462 B2 | 11/2005 | Katoh et al. |
| 6,974,196 B2 | 12/2005 | Gagne et al. |
| 7,077,216 B2 | 7/2006 | Juncker |
| 7,114,788 B2 | 10/2006 | Deland et al. |
| 7,229,141 B2 | 6/2007 | Dandurand et al. |
| 7,293,844 B2 | 11/2007 | Uchiyama |
| 7,325,888 B2 | 2/2008 | Fujita et al. |
| 7,367,637 B2 | 5/2008 | Gleasman |
| 7,413,268 B2 | 8/2008 | Kato et al. |
| 7,625,050 B2 | 12/2009 | Bair |
| 7,784,884 B2 | 8/2010 | Soucy et al. |
| 2002/0050741 A1* | 5/2002 | Gauthier ............... B29C 37/005 305/165 |
| 2002/0070607 A1 | 6/2002 | Edwards |
| 2002/0140288 A1 | 10/2002 | Herberger et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0080618 A1 | 5/2003 | Krishnan et al. |
| 2004/0004395 A1 | 1/2004 | Soucy et al. |
| 2004/0070273 A1 | 4/2004 | Safe et al. |
| 2004/0130212 A1 | 7/2004 | Ishibashi |
| 2004/0135433 A1 | 7/2004 | Inaoka |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0103236 A1 | 5/2006 | Soucy et al. |
| 2006/0175108 A1 | 8/2006 | Kubota |
| 2006/0220456 A1 | 10/2006 | Sugahara |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0252433 A1 | 11/2007 | Fujita |
| 2008/0007118 A1 | 1/2008 | Fujita |
| 2008/0073971 A1 | 3/2008 | Paradis et al. |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0102283 A1 | 4/2009 | Choi |
| 2009/0195062 A1 | 8/2009 | Uchida |
| 2009/0302677 A1 | 12/2009 | Sugihara |
| 2009/0309415 A1 | 12/2009 | Shimozono |
| 2010/0033010 A1 | 2/2010 | Shimozono |
| 2010/0095506 A1 | 4/2010 | Bair |
| 2010/0096915 A1 | 4/2010 | Hagio |
| 2010/0283317 A1 | 11/2010 | Soucy et al. |
| 2011/0121644 A1 | 5/2011 | Wellman |

FOREIGN PATENT DOCUMENTS

| | | |
|---|---|---|
| EP | 0578504 | 2/1997 |
| EP | 1273504 | 1/2003 |
| EP | 1283152 | 2/2003 |
| EP | 1260429 | 7/2007 |
| EP | 1882627 | 10/2010 |
| JP | 2002074476 | 3/1990 |
| JP | 11-129946 | 5/1999 |
| JP | 2000053037 | 2/2000 |
| JP | 2003-011860 | 1/2003 |
| JP | 2004330830 | 11/2004 |
| JP | 2007022304 | 2/2007 |
| JP | 2009061829 | 3/2009 |
| JP | 2009248924 | 10/2009 |
| JP | 2010018091 | 1/2010 |
| JP | 2010047040 | 3/2010 |
| JP | 2010089729 | 4/2010 |
| WO | 2008/108439 | 9/2008 |
| WO | 2009/105892 | 9/2009 |
| WO | 2009/106617 | 9/2009 |

OTHER PUBLICATIONS

Restriction Requirement issued by the USPTO dated Jun. 9, 2014 in connection with U.S. Appl. No. 13/326,278, 7 pages.
Final Office Action issued by the USPTO dated Jun. 26, 2015 in connection with U.S. Appl. No. 13/326,278, 15 pages.
Restriction Requirement issued by the USPTO dated May 20, 2014 in connection with U.S. Appl. No. 13/325,783, 6 pages.

(56) References Cited

OTHER PUBLICATIONS

Non-Final Office Action issued by the USPTO dated Sep. 29, 2014 in connection with U.S. Appl. No. 13/325,783, 12 pages.
Notice of Allowance issued by the USPTO dated Mar. 4, 2015, in connection with U.S. Appl. No. 13/325,783, 13 pages.
Restriction Requirement issued by the USPTO dated May 20, 2014, in connection with U.S. Appl. No. 13/325,796, 6 pages.
Non-Final Office Action issued by the USPTO dated Sep. 22, 2014, in connection with U.S. Appl. No. 13/325,796, 25 pages.
Final Office Action issued by the USPTO dated Mar. 5, 2015, in connection with U.S. Appl. No. 13/325,796, 33 pages.
Notice of Allowance issued by the USPTO dated Jun. 26, 2015, in connection with U.S. Appl. No. 13/325,796, 9 pages.
Non-Final Office Action issued by the USPTO dated Dec. 1, 2016 in connection with U.S. Appl. No. 15/139,572, 18 pages.
Non-Final Office Action issued by the USPTO dated Jan. 11, 2017 in connection with U.S. Appl. No. 14/886,327, 11 pages.
Non-Final Office Action issued by the USPTO dated Feb. 21, 2017 in connection with U.S. Appl. No. 14/721,236, 12 pages.

* cited by examiner

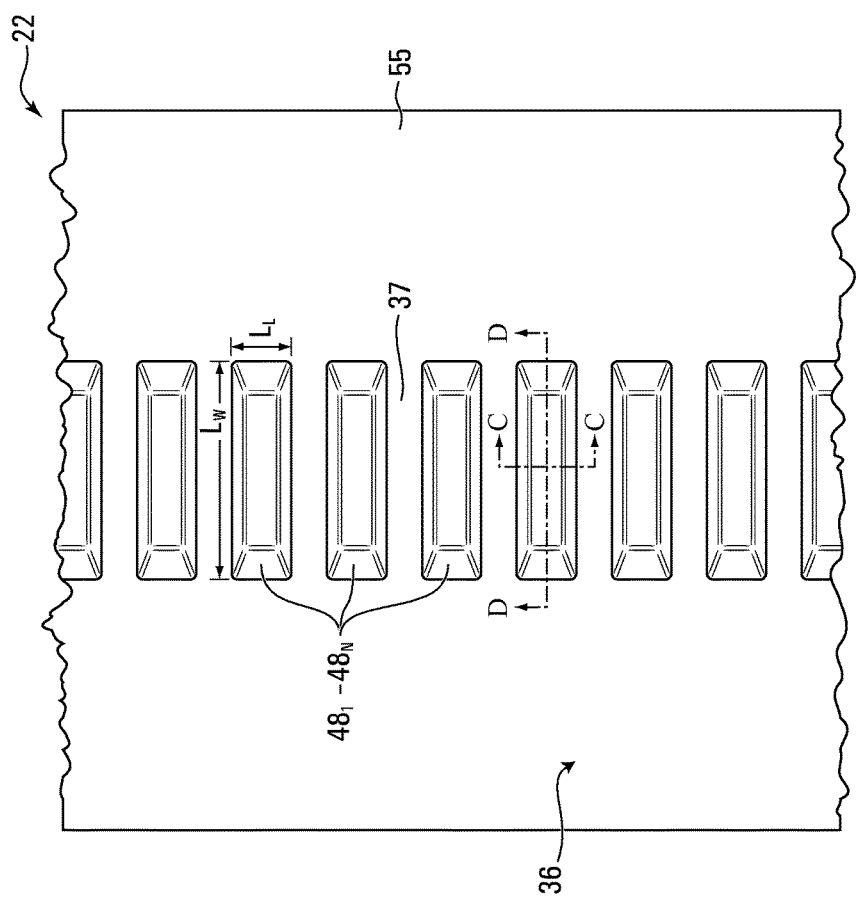

ENDLESS TRACK FOR TRACTION OF A VEHICLE

CROSS-REFERENCE TO RELATED APPLICATION

This application is a continuation of U.S. patent application Ser. No. 13/325,783, filed on Dec. 14, 2011; which claims the benefit of 35 USC 119(e) of U.S. Provisional Patent Application No. 61/422,968, filed on Dec. 14, 2010. Each application is hereby incorporated by reference herein.

FIELD OF THE INVENTION

The invention relates to endless tracks for providing traction to off-road vehicles and to components of such tracks.

BACKGROUND

Certain off-road vehicles, such as agricultural vehicles (e.g., harvesters, combines, tractors, etc.), industrial vehicles such as construction vehicles (e.g., loaders, bulldozers, excavators, etc.) and forestry vehicles (e.g., feller-bunchers, tree chippers, knuckleboom loaders, etc.), and military vehicles (e.g., combat engineering vehicles (CEVs), etc.) to name a few, may be equipped with elastomeric endless tracks which enhance their traction and floatation on soft, slippery and/or irregular grounds (e.g., soil, mud, sand, ice, snow, etc.) on which they operate.

One type of elastomeric endless track comprises an inner side including a plurality of drive/guide projections, commonly referred to as "drive/guide lugs", which are spaced apart along its longitudinal direction and used for driving and/or guiding the track around wheels of a vehicle to which the track provides traction. Very often, a main factor reducing the track's useful life is wear or other deterioration (e.g., deformation) of the drive/guide lugs. For example, as they move relative to the wheels of the vehicle, the drive/guide lugs come into contact with (e.g., impact and/or rub or otherwise frictionally contact) one or more of these wheels and this contact can wear or otherwise deteriorate (e.g., deform) their elastomeric material (e.g., rubber). Over time, such contact can wear or otherwise deteriorate the drive/guide lugs, possibly to a point where the drive/guide lugs are so deteriorated that the track can no longer be used efficiently and has to be repaired or replaced. In some cases, such deterioration of the drive/guide lugs can occur although a carcass of the track remains in acceptable condition. In other words, the drive/guide lugs can deteriorate at a significantly greater rate than the carcass of the track.

This type of track also comprises a ground-engaging outer side including a plurality of traction projections, commonly referred to as "traction lugs", which are spaced apart along its longitudinal direction to enhance traction on the ground. Although it may be less severe than wear or other deterioration of the track's drive/guide lugs, wear or other deterioration of the traction lugs (e.g., due to particularly abrasive ground material) can sometimes become significant enough to force replacement of the track even though the track's carcass is still in acceptable condition.

For these and other reasons, there is a need to improve elastomeric endless tracks for traction of vehicles and components of such tracks.

SUMMARY OF THE INVENTION

According to an aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric drive/guide lugs projecting from the inner surface. Each elastomeric drive/guide lug of the plurality of elastomeric drive/guide lugs has a material composition defining an arrangement of zones of different materials. The arrangement of zones of different materials comprises a plurality of zones of different elastomeric materials. The elastomeric drive/guide lug exhibits a desired variation of a material property across the arrangement of zones of different materials.

According to another aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of traction lugs projecting from the ground-engaging outer surface. Each elastomeric traction lug of the plurality of elastomeric traction lugs has a material composition defining an arrangement of zones of different materials. The arrangement of zones of different materials comprises a plurality of zones of different elastomeric materials. The elastomeric traction lug exhibits a desired variation of a material property across the arrangement of zones of different materials.

According to an aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric lugs projecting from a given one of the inner surface and the ground-engaging outer surface. Each elastomeric lug of the plurality of elastomeric lugs has a material composition defining an arrangement of zones of different materials. The arrangement of zones of different materials comprises a plurality of zones of different elastomeric materials. The elastomeric lug exhibits a desired variation of a material property across the arrangement of zones of different materials.

According to another aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric drive/guide lugs projecting from the inner surface. Each elastomeric drive/guide lug of the plurality of elastomeric drive/guide lugs comprises a plurality of zones of different elastomeric materials. The elastomeric drive/guide lug exhibits an increase of a modulus of elasticity inwardly.

According to another aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric drive/guide lugs projecting from the inner surface. Each elastomeric drive/guide lug of the plurality of elastomeric drive/guide lugs comprises a first elastomeric material and a second elastomeric material stiffer than the first elastomeric material. The first elastomeric material is disposed between a periphery of the elastomeric drive/guide lug and the second elastomeric material.

According to another aspect of the invention, there is provided a method of making an endless track for traction of an off-road vehicle. The endless track is mountable around a plurality of wheels of the off-road vehicle. The plurality of wheels comprises a drive wheel for driving the endless track. The method comprises forming an elastomeric belt-shaped body of the endless track. The elastomeric belt-shaped body comprises an inner surface for facing the wheels and a ground-engaging outer surface for engaging the ground. The method also comprises forming a plurality of elastomeric lugs of the endless track which project from a given one of the inner surface and the ground-engaging outer surface. Each elastomeric lug of the plurality of elastomeric lugs has a material composition defining an arrangement of zones of different materials. The arrangement of zones of different materials comprises a plurality of zones of different elastomeric materials. The elastomeric lug exhibits a desired variation of a material property across the arrangement of zones of different materials.

According to another aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric lugs projecting from a given one of the inner surface and the ground-engaging outer surface. Each elastomeric lug of the plurality of elastomeric lugs has a material composition defining an arrangement of zones of different materials. The arrangement of zones of different materials comprises a sacrificial zone designed to be sacrificed during use of the endless track.

According to another aspect of the invention, there is provided a method of making an endless track for traction of an off-road vehicle. The endless track is mountable around a plurality of wheels of the off-road vehicle. The plurality of wheels comprises a drive wheel for driving the endless track. The method comprises forming an elastomeric belt-shaped body of the endless track. The elastomeric belt-shaped body comprises an inner surface for facing the wheels and a ground-engaging outer surface for engaging the ground. The method also comprises forming a plurality of elastomeric lugs of the endless track which project from a given one of the inner surface and the ground-engaging outer surface. Each elastomeric lug of the plurality of elastomeric lugs has a material composition defining an arrangement of zones of different materials. The arrangement of zones of different materials comprises a sacrificial zone designed to be sacrificed during use of the endless track.

According to another aspect of the invention, there is provided an endless track for traction of an off-road vehicle. The endless track is mountable around a plurality of wheels of the off-road vehicle. The plurality of wheels comprises a drive wheel for driving the endless track. The endless track comprises an elastomeric belt-shaped body comprising an inner surface for facing the wheels and a ground-engaging outer surface for engaging the ground. The endless track also comprises a plurality of elastomeric lugs projecting from a given one of the inner surface and the ground-engaging outer surface. Each elastomeric lug of the plurality of elastomeric lugs has a material composition defining an arrangement of zones of different materials. The arrangement of zones of different materials comprises a wear indicator zone to indicate a level of wear of the elastomeric lug.

According to another aspect of the invention, there is provided an endless track for traction of an off-road vehicle. The endless track is mountable around a plurality of wheels of the off-road vehicle. The plurality of wheels comprises a drive wheel for driving the endless track. The drive wheel comprises a plurality of drive members spaced apart from one another. The endless track comprises an elastomeric belt-shaped body comprising an inner surface for facing the wheels and a ground-engaging outer surface for engaging the ground. The endless track also comprises a plurality of elastomeric drive lugs projecting from the inner surface and configured to engage the drive wheel. Each elastomeric drive lug of the plurality of elastomeric drive lugs comprises a drive surface for contacting a drive member of the plurality of drive members when the elastomeric drive lug engages the drive member. The drive surface of the elastomeric drive lug is uneven such that an uneven portion of the elastomeric drive lug contacts the drive member when the elastomeric drive lug engages the drive member.

According to another aspect of the invention, there is provided an endless track for traction of an off-road vehicle. The endless track is mountable around a plurality of wheels of the off-road vehicle. The plurality of wheels comprises a drive wheel for driving the endless track. The drive wheel comprises a plurality of drive members spaced apart from one another. The endless track comprises an elastomeric belt-shaped body comprising an inner surface for facing the wheels and a ground-engaging outer surface for engaging the ground. The endless track also comprises a plurality of elastomeric drive lugs projecting from the inner surface and configured to engage the drive wheel. Each elastomeric drive lug of the plurality of elastomeric drive lugs comprises a drive surface for contacting a drive member of the plurality of drive members when the elastomeric drive lug engages the drive member. The drive surface of the elastomeric drive lug forming a protrusion of the elastomeric drive lug. The protrusion of the elastomeric drive lug extends towards and contacts the drive member when the elastomeric drive lug engages the drive member.

According to another aspect of the invention, there is provided a method of making an endless track for traction of an off-road vehicle. The endless track is mountable around a plurality of wheels of the off-road vehicle. The plurality of wheels comprises a drive wheel for driving the endless track. The drive wheel comprises a plurality of drive members spaced apart from one another. The method comprises forming an elastomeric belt-shaped body of the endless track. The elastomeric belt-shaped body comprises an inner surface for facing the wheels and a ground-engaging outer surface for engaging the ground. The method also comprises forming a plurality of elastomeric drive lugs of the endless track which project from the inner surface. Each elastomeric drive lug of the plurality of elastomeric drive lugs comprises a drive surface for contacting a drive member of the plurality of drive members when the elastomeric drive lug engages the drive member. The drive surface of the elastomeric drive lug is uneven such that an uneven portion of the elastomeric drive lug contacts the drive member when the elastomeric drive lug engages the drive member.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 2 to 5 respectively show a outer plan view, a side view, an inner plan view, and a cross-sectional view of an example of an endless track of a track assembly of the tracked vehicle;

FIGS. 10A to 11B, 13A, 13B, 14 to 18A, 19 and 20 show different examples of an inner lug of the endless track having an arrangement of zones of different materials;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS OF THE INVENTION

Figure 1:
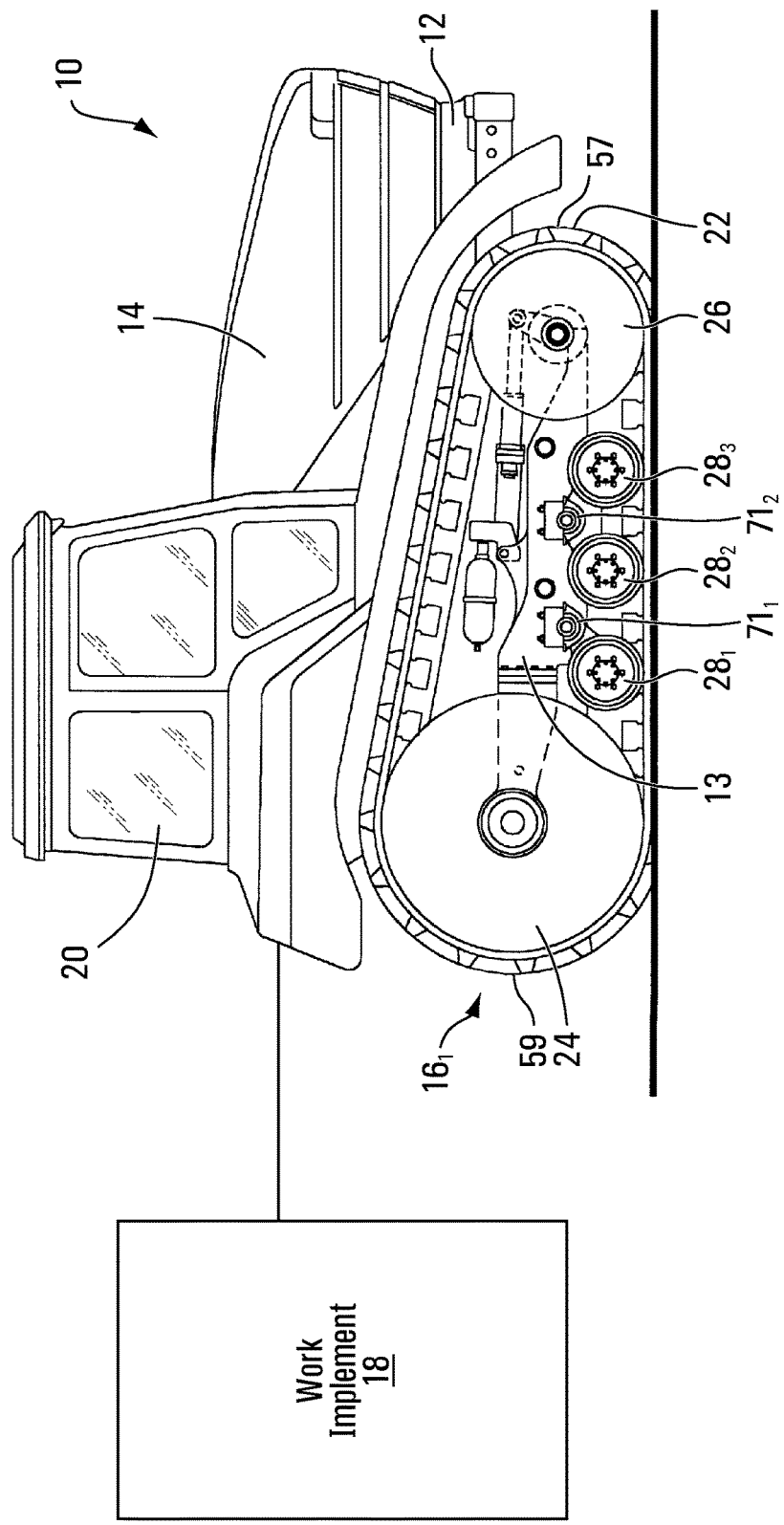
FIG. 1 shows an example of a tracked vehicle in accordance with an embodiment of the invention.

FIG. 1 shows an example of an off-road tracked vehicle 10 in accordance with an embodiment of the invention. In this embodiment, the vehicle 10 is a heavy-duty work vehicle for performing agricultural work, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12 supporting a prime mover 14, a pair of track assemblies $16_1$, $16_2$ (which can be referred to as "undercarriages"), and an operator cabin 20, which enable an operator to move the agricultural vehicle 10 on the ground to perform agricultural work possibly using a work implement 18.

The prime mover 14 provides motive power to move the agricultural vehicle 10. For example, the prime mover 14 may comprise an internal combustion engine and/or one or more other types of motors (e.g., electric motors, etc.) for generating motive power to move the agricultural vehicle 10. The prime mover 14 is in a driving relationship with each of the track assemblies $16_1$, $16_2$. That is, power derived from the prime mover 14 is transmitted to the track assemblies $16_1$, $16_2$ via a powertrain of the agricultural vehicle 10.

The work implement 18 is used to perform agricultural work. For example, in some embodiments, the work implement 18 may be a combine head, a cutter, a scraper, a tiller or any other type of agricultural work implement.

The operator cabin 20 is where the operator sits and controls the agricultural vehicle 10. More particularly, the operator cabin 20 comprises a set of controls that allow the operator to steer the agricultural vehicle 10 on the ground and operate the work implement 18.

The track assemblies $16_1$, $16_2$ engage the ground to propel the agricultural vehicle 10. More particularly, in this embodiment, each track assembly $16_i$ comprises an endless track 22 disposed around a plurality of wheels, including a drive wheel 24 and a plurality of idler wheels which includes a front idler wheel 26 and a plurality of roller wheels $28_1$-$28_6$. The track assembly $16_i$ also comprises a frame 13 which supports various components of the track assembly $16_i$, including the roller wheels $28_1$-$28_6$. The track assembly $16_i$ has a first longitudinal end 57 and a second longitudinal end 59 that define a length of the track assembly $16_i$. A width of the track assembly $16_i$ is defined by a width of the endless track 22. The track assembly $16_i$ has a longitudinal direction, a widthwise direction, and a height direction.

Figure 3:
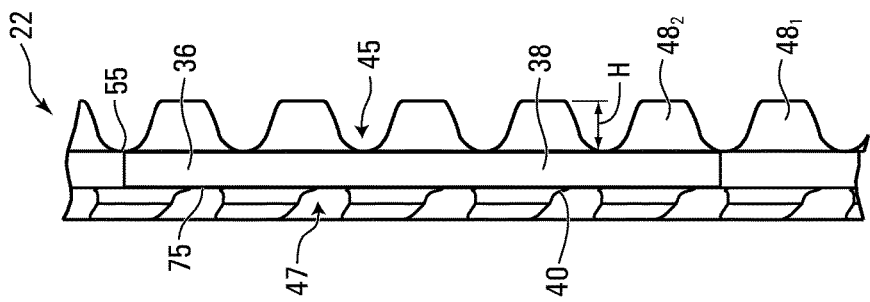

The endless track 22 engages the ground to provide traction to the agricultural vehicle 10. With additional reference to FIGS. 2 to 4, the track 22 has an inner side 45 facing the wheels 24, 26, $28_1$-$28_6$ and defining an inner area of the track 22 in which these wheels are located. The track 22 also has a ground-engaging outer side 47 opposite the inner side 45 and engaging the ground on which the agricultural vehicle 10 travels. The track 22 has a top run 65 which extends between the longitudinal ends 57, 59 of the track assembly $16_i$ and over the wheels 24, 26, $28_1$-$28_6$ and a bottom run 66 which extends between the longitudinal ends 57, 59 of the track assembly $16_i$ and under the wheels 24, 26, $28_1$-$28_6$. The track 22 has a longitudinal direction, a widthwise direction, and a thickness direction.

The endless track 22 comprises an elastomeric belt-shaped body 36 underlying its inner side 45 and its ground-engaging outer side 47. In view of its underlying nature, the belt-shaped body 36 can be referred to as a "carcass". The carcass 36 is elastomeric in that it comprises elastomeric material 38 which allows the track 22 to elastically change in shape as it is in motion around the wheels 24, 26, $28_1$-$28_6$. The elastomeric material 38 can be any polymeric material with suitable elasticity. In this embodiment, the elastomeric material includes rubber.

Various rubber compounds may be used and, in some cases, different rubber compounds may be present in different areas of the track 22. In other embodiments, the elastomeric material 38 may include another elastomer in addition to or instead of rubber (e.g., polyurethane elastomer).

Figure 2:
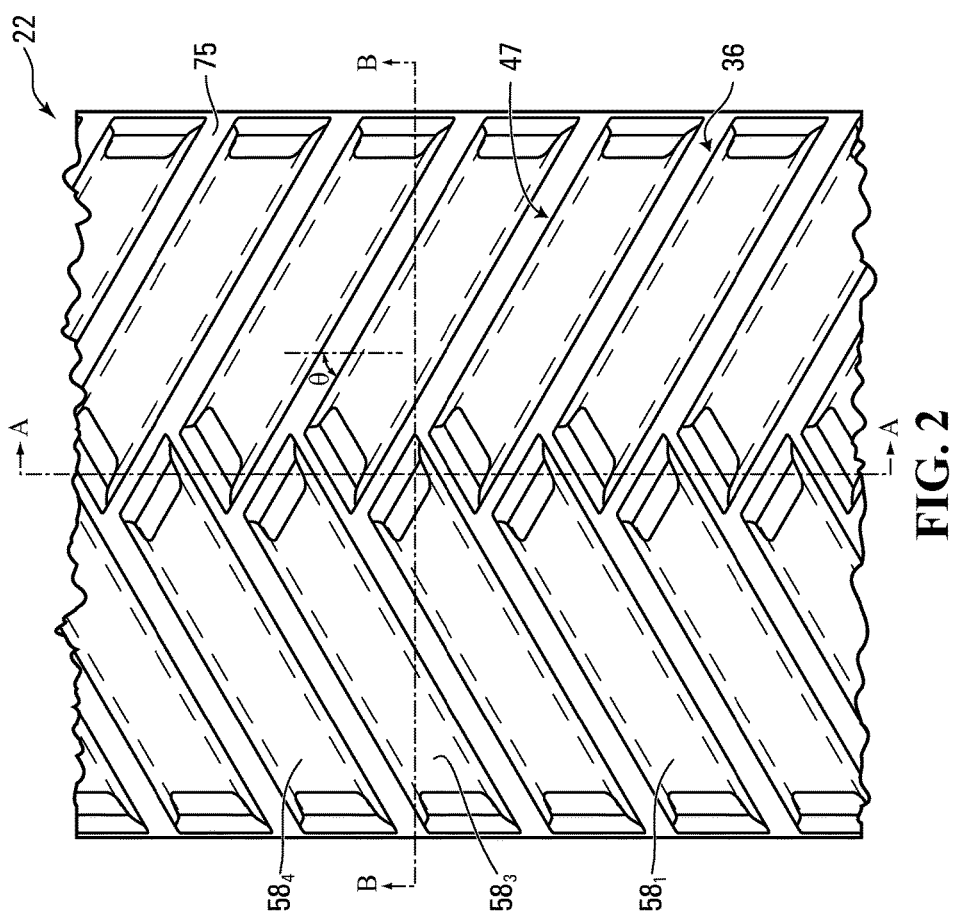
Figure 5:
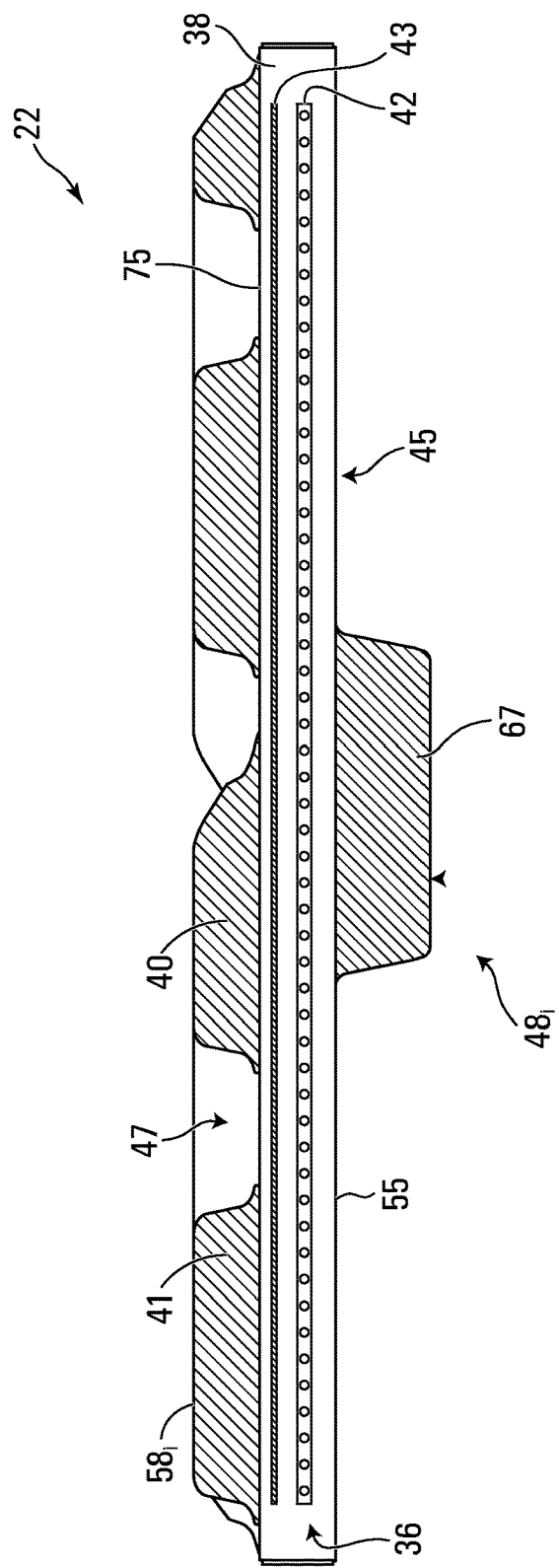

As shown in FIG. 5, which is a cross-sectional view of track 22 taken along line B-B in FIG. 2, in this embodiment, the carcass 36 comprises a plurality of reinforcements 42, 43 embedded in its elastomeric material 38. In this example, the reinforcement 42 is a layer of reinforcing cables that are adjacent to one another and that extend in the longitudinal direction of the track 22 to enhance strength in tension of the track 22 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). The reinforcement 43 is a layer of reinforcing fabric. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The ground-engaging outer side 47 comprises a ground-engaging outer surface 75 of the carcass 36 and a tread pattern 40 to enhance traction on the ground. The tread pattern 40 comprises a plurality of traction projections $58_1$-$58_T$, which will be referred to as "traction lugs", projecting from the ground-engaging outer surface 75, spaced apart along the longitudinal direction of the endless track 22 and engaging the ground to enhance traction. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the endless track 22. The traction lugs $58_1$-$58_T$ may have various other shapes in other examples (e.g., curved shapes, shapes with straight parts and curved parts, etc.).

In this embodiment, each traction lugs $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 27 in various ways. For example, in this embodiment, the traction lugs $58_1$-$58_T$ are provided on the ground-engaging outer side 27 by being molded with the carcass 36.

The inner side 45 of the endless track 22 comprises an inner surface 55 of the carcass 36 and a plurality of inner wheel-contacting projections $48_1$-$48_N$ that project from the inner surface 55 and are positioned to contact at least some of the wheels 24, 26, $28_1$-$28_6$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the idler wheel 26 and/or the roller wheels $28_1$-$28_6$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheel 26 and/or the roller wheels $28_1$-$28_6$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheel 26 and the roller wheels $28_1$-$28_6$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

Figure 6A:
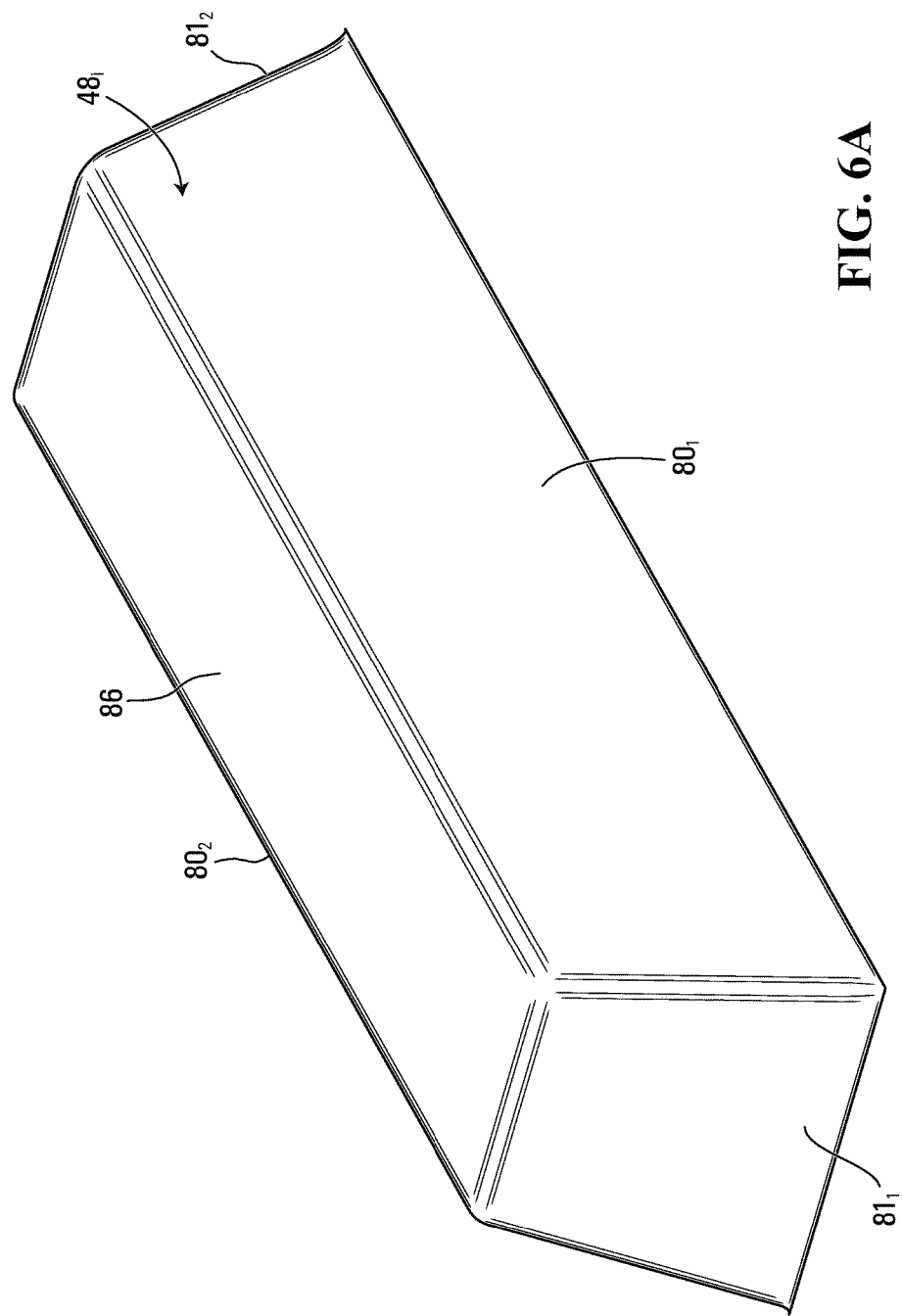
FIG. 6A shows an example of an inner lug of the endless track.
Figure 6B:
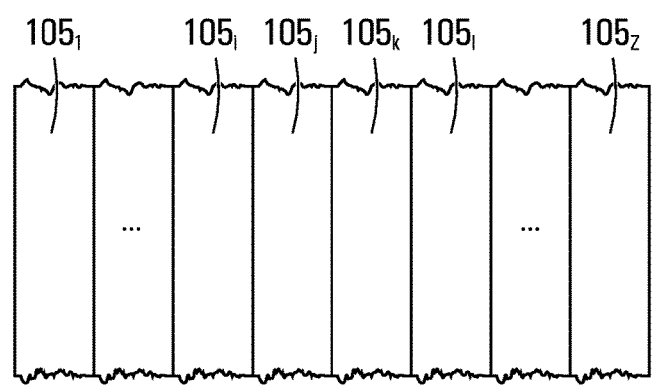
FIG. 6B shows an example of an arrangement of zones of different materials of an inner lug of the endless track.

The drive/guide lugs $48_1$-$48_N$ may have any suitable shape. With additional reference to FIG. 6, each drive/guide lug $48_i$ has a periphery 69 which, in this embodiment, includes a front surface $80_1$, a rear surface $80_2$, two side surfaces $81_1$, $81_2$, and a top surface 86. The front surface $80_1$ and the rear surface $80_2$ are opposed to one another along the longitudinal direction of the track 22. In this embodiment where the drive/guide lug $48_i$ is used to drive the track 22, each of the front surface $80_1$ and the rear surface $80_2$ constitutes a drive surface which can be contacted by a drive member of the drive wheel 24 that pushes against it to impart motion to the track 22. The two side faces $81_1$, $81_2$ are laterally opposed and may contact the roller wheels $28_1$-$28_6$, the drive wheel 24 and/or the idler wheel 26 such as to prevent excessive lateral movement of the track 22 relative the wheels and to thus prevent de-tracking. Although it has a certain shape in this embodiment, the periphery 70 of the drive/guide lug $48_i$ may have various other shapes in other embodiments.

Each drive/guide lug $48_i$ has a front-to-rear dimension $L_L$ in the longitudinal direction of the endless track 22 and a side-to-side dimension $L_W$ in the widthwise direction of the endless track 22. In some cases, the front-to-rear dimension $L_L$ may be a width of the drive/guide lug $48_i$ while the side-to-side dimension $L_W$ may be a length of the drive/guide lug $48_i$. In other cases, the front-to-rear dimension $L_L$ may be a length of the drive/guide lug $48_i$ while the side-to-side dimension $L_W$ may be a width of the drive/guide lug $48_i$. In yet other cases, the front-to-rear dimension $L_L$ and the side-to-side dimension $L_W$ may be substantially the same. The drive/guide lug $48_i$ also has a height H.

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The endless track 22 may be constructed in various other manners in other embodiments. For example, in some embodiments, the track 22 may comprise a plurality of elastomeric sections (e.g., rubber sections) connected to one another to form the belt-shaped body 36, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain of the agricultural vehicle 10 can rotate a driven axle, which causes rotation of the drive wheel 24, which in turn imparts motion of the track 22.

Figure 7:
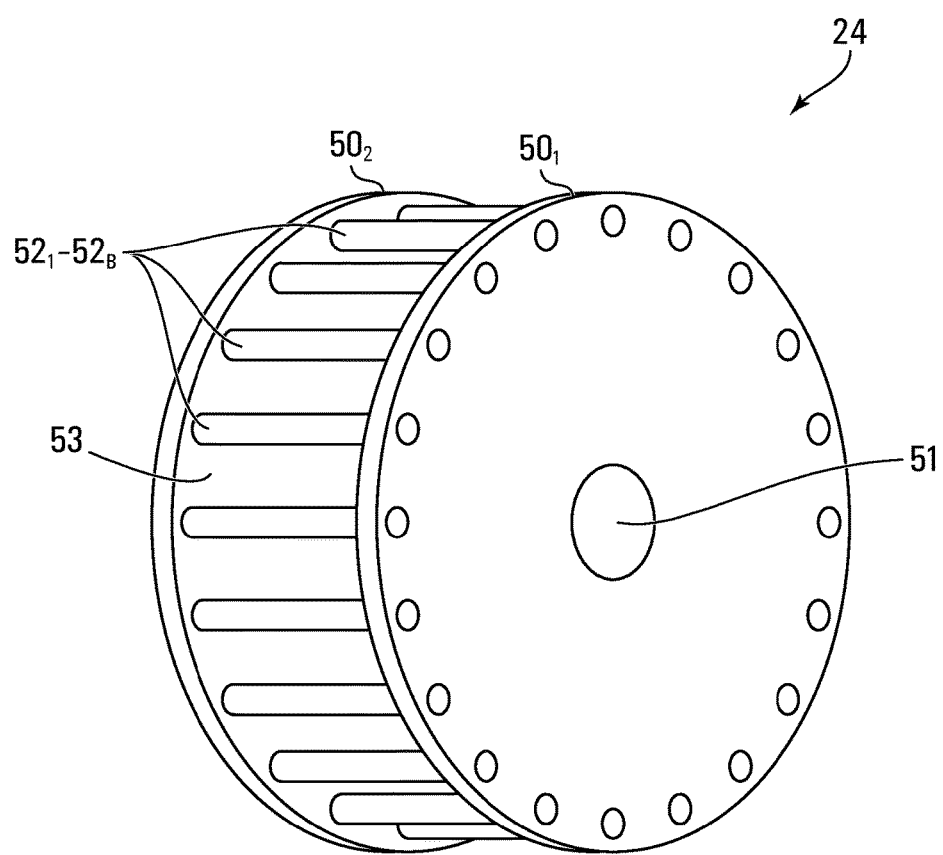
FIG. 7 shows an example of a drive wheel of the track assembly.

With additional reference to FIG. 7, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" system. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 37 between them to receive one of the drive bars $52_1$-$52_B$. The drive/guide lugs $48_1$-48N and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" system).

The front idler wheel 26 and the roller wheels $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front idler wheel 26 is a leading idler wheel which maintains the track 22 in tension and helps to support part of the weight of the agricultural vehicle 10 on the ground via the track 22. The roller wheels $28_1$-$28_6$ roll on a rolling path 33 of the inner side 45 of the track 22 along the bottom run 66 of the track 22 to apply the bottom run 66 on the ground. In this case, as they are located between frontmost and rearmost ones of the wheels of the track assembly $16_i$, the roller wheels $28_1$-$28_6$ can be referred to as "mid-rollers".

The drive/guide lugs $48_1$-$48_N$ are susceptible to wear or other deterioration, notably due to their motion relative to the wheels 24, 26, $28_1$-$28_6$. For example, in some cases, as the drive/guide lugs $48_1$-$48_N$ contact the drive wheel 24, forces exerted on the lugs $48_1$-$48_N$ create stresses in them which may tend to wear or otherwise deteriorate them. As another example, in some cases, friction between the drive/guide lugs $48_1$-$48_N$ and the mid-rollers $28_1$-$28_6$ may also induce wear of the lugs $48_1$-$48_N$ and/or the mid-rollers $28_1$-$28_6$.

Various forces and effects may contribute to the wear or other deterioration of drive/guide lugs $48_1$-$48_N$. For example, in various cases, loads applied on the drive/guide lugs $48_1$-$48_N$ (e.g., by the drive wheel 24 and/or mid-rollers $28_1$-$28_6$) and/or ingestion of debris (e.g., rocks or other ground matter) within the track assembly $16_i$ may cause crack initiation and propagation, abrasion, tearing and/or effects tending to wear or otherwise deteriorate the drive/guide lugs $48_1$-$48_N$. Examples of such factors will be discussed below for illustrative purposes, without wishing to be bound by theory.

Figure 8:
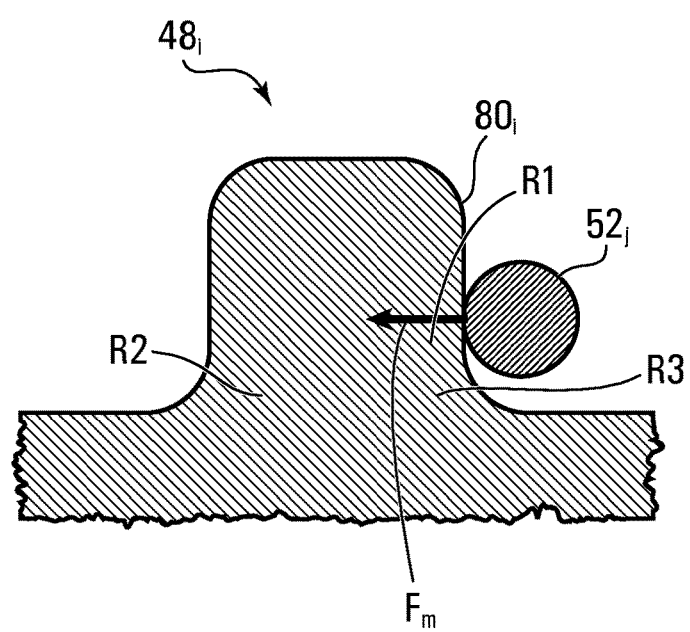
FIG. 8 shows an example of an inner lug of the endless track engaging a drive member of the drive wheel.

For instance, FIG. 8 is a cross-sectional view of a drive/guide lug $48_i$, taken along line C-C of FIG. 4, but shown positioned in the interior space 53 adjacent to a drive bar $52_j$ of the drive wheel 24. When, in motion, the drive/guide lug $48_i$ received within the interior space 53 is contacted by the drive bar $52_j$ on its front surface $80_1$, the drive bar $52_j$ pushes against the front surface $80_1$ and applies thereto a force $F_M$. The force $F_M$ causes the drive/guide lug $48_i$ to move with the drive bar $52_j$, which in turn causes the whole track 22 to move within the track assembly $16_i$. Although only the lug $48_i$ is being discussed here, multiple ones of the drive/guide lugs $48_1$-$48_N$ may be in interlock with the drive sprocket 24 at any given time so that the cumulative forces applied on all those lugs interlocked with the sprocket 24 combine to cause the motion of the track 22. The force $F_M$ may not be constant but may vary depending on the position of the drive/guide lug $48_i$ within the sprocket 24, and is applied only while the drive/guide lug $48_i$ is in contact with the sprocket 24.

The force $F_M$ applied to the drive/guide lug $48_i$ may cause various strains on the drive/guide lug $48_i$. For example, the force $F_M$ applied to the drive/guide lug $48_i$ may cause a compressive strain in a region R1 of the drive/guide lug $48_i$ proximate its front surface $80_1$. In certain instances, the drive/guide lug $48_i$ may deform under the force $F_M$, such as by bending in the direction of the force $F_M$. Such bending causes a compressive strain in a region R2 of the drive/guide lug $48_i$ and tensile strain in a region R3 of the drive/guide lug $48_i$.

Repeated deformation of the drive/guide lug $48_i$, possibly combined with friction on the drive/guide lug $48_i$, causes heat to be generated within the drive/guide lug $48_i$. This heat may change properties of a material making up part or all of the drive/guide lug $48_i$, such as an elastic modulus, a hardness, an abrasion resistance, etc., causing it to be less suited for resisting the forces applied on the drive/guide lug $48_i$. Over time, if the heat generated is excessive, this may cause premature ageing of a materials making up part or all of the drive/guide lug $48_i$, therefore limiting the elasticity of material that can be used. On the other hand, if a material is too rigid, stresses in the drive/guide lug $48_i$, such as tensile stresses in the region R3, may cause the drive/guide lug $48_i$ to crack, and/or brittleness effects may arise.

Due to loads, material properties or changes in material properties, and/or hysteresis effects, in some cases, the drive/guide lug $48_i$ may also become deformed in such a way that it loses a desired shape with which it was designed. This may lead to additional stresses (e.g. from increased rubbing and compression in the track assembly 16) which in turn may lead to further hastened wearing. For instance, this deformation may reduce a clearance between the drive/guide lug $48_i$ in contact with the sprocket bar $52_j$ and the following sprocket bar $52_k$, possibly to a point where there can be interference between the sprocket bar $52_k$ and the drive/guide lug $48_i$. In such cases, the movement of the sprocket bar $52_k$ relative to the drive/guide lug $48_i$ would generate a scrubbing force on a portion of the face of the drive/guide lug $48_i$. A pitch between consecutive ones of the drive/guide lugs $48_1$-$48_N$ may be altered (e.g., increased) compared to its designed value.

The drive/guide lug $48_i$ may also crack. For instance, due to manufacturing or material imperfections or simply age, tension in the drive/guide lug $48_i$ may cause the drive/guide lug $48_i$ to crack. Cracks may also develop in the absence of induced weaknesses if, for example, an excessive applied force causes a tensile stress in the drive/guide lug $48_i$ that is higher than a certain threshold.

Debris, such as rocks, mud, dirt, or other foreign matter ingested within the track assembly $16_i$, may contact and rub against the drive/guide lug $48_i$. In particular, if debris enters the drive wheel 24, and more particularly if it comes between the sprocket bar $52_j$ and the drive/guide lug $48_i$, the front face 80 of the drive/guide lug $48_i$ may be subject to abrasion or chunking, particularly in the region R1.

Figure 9:
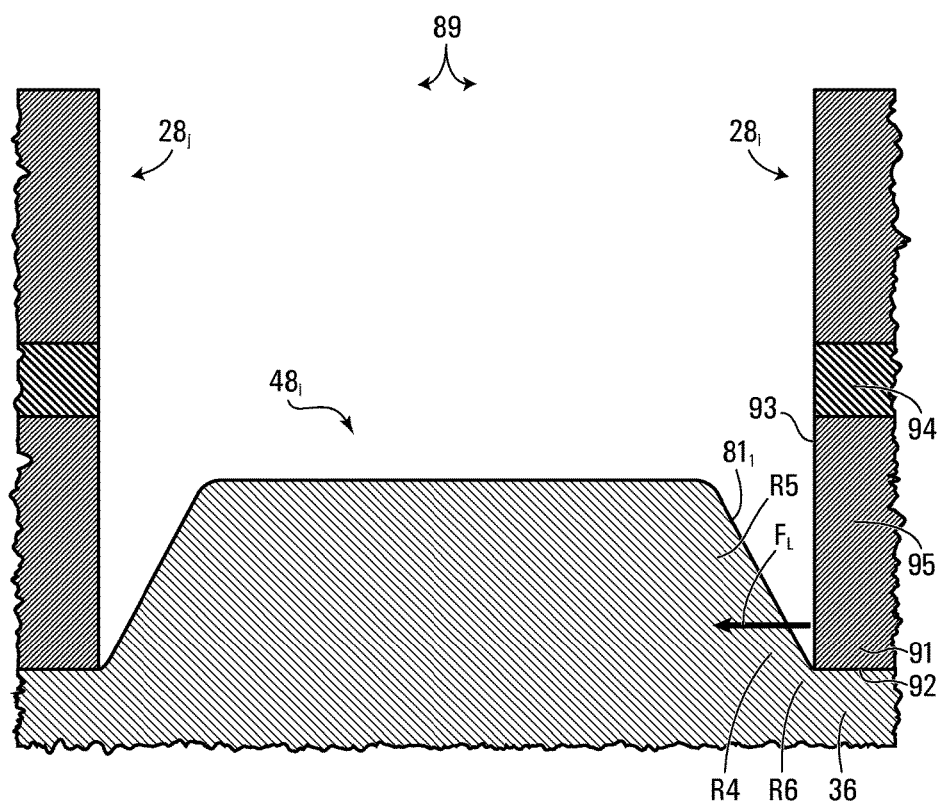
FIG. 9 shows an example of an inner lug of the endless track between roller wheels of the track assembly.

FIG. 9 is a cross-sectional view of the drive/guide lug $48_i$ taken along line D-D of FIG. 4 but shown between mid-rollers $28_i$, $28_j$ that laterally face adjacent one another. The lateral spacing of the mid-rollers $28_i$, $28_j$ may be greater than the width of the drive/guide lug $48_i$ to provide a clearance between the drive/guide lug $48_i$ and the mid-rollers $28_i$, $28_j$.

The mid-roller $28_i$ is adapted to rotate about an axle 94. The mid-roller $28_i$ has a peripheral portion 91 adjacent the inner side 45 of the track 22 and a body portion between the axle 94 and the peripheral portion 91. The peripheral portion 91 of the mid-roller $28_i$ has a peripheral surface 92 to roll on the inner side 45 of the track 22. The mid-roller $28_i$ also has an inner lateral surface 93 adjacent the side surface $81_1$ of the drive/guide lug $48_i$.

In use, the drive/guide lug $48_i$ may contact the mid-roller $28_i$ (e.g., due to track misalignment or loading on the track assembly $16_i$ causing lateral movement of the mid-roller $28_i$). This causes the mid-roller $28_i$ to exert a force $F_L$ on the drive/guide lug $48_i$. The force $F_L$ may cause compression of a region R4 of the drive/guide lug $48_i$. Depending on the shape of the drive/guide lug $48_i$ and/or the mid-roller $28_i$, the region R4 where the bulk of the force $F_L$ is absorbed may vary in location. For instance, in this example, the region R4 is near the lower portion of the drive/guide lug $48_i$, adjacent the peripheral portion 91 of the mid-roller $28_i$.

Compression in the region R4 may also result in tension elsewhere in the drive/guide lug $48_i$, such as in a region R6. Compression, such as compression in the region R4, and tension, such as in the region R6, may result in similar deleterious effects on the drive/guide lug $48_i$ as those described above.

As the force $F_L$ presses the region R4 towards the inner surface 93 of the mid-roller $28_i$, additional areas of the side surface $81_1$ of the drive/guide lug $48_i$ may come in contact and/or press against the inner lateral surface 93 of the mid-roller $28_i$. For example, a portion of the drive/guide lug $48_i$ may contact the inner lateral surface 93 of the mid-roller $28_i$ adjacent the mid portion 95 thereof. This may be caused, for instance, by the contraction of the drive/guide lug $48_i$ in the region R4, resulting in the flattening of the angled profile of the side surface $81_1$ into a more vertical profile or by the twisting or bending of the track 22. Alternatively, this may simply be caused by the geometry of the drive/guide lug $48_i$ and/or the geometry of the mid-roller $28_i$.

When the mid-roller $28_i$ turns about its axel 94 and rolls on the inner side 45 of the endless track 22, there is a difference in velocity between respective points of the drive/guide lug $48_i$ and the mid-roller $28_i$ which face one another. More particularly, since the entire drive/guide lug $48_i$ moves at approximately the same velocity, and since the mid-roller $28_i$ has a tangential velocity which varies across its radius, even if the tangential velocity of the mid-roller $28_i$ matches the velocity of the drive/guide lug $48_i$ at a particular distance from the mid-roller's center (namely, at the peripheral surface 92 of the mid-roller $28_i$ which contacts the rolling path 33 of the track 22), the tangential velocity of the mid-roller $28_i$ will not match the velocity of the drive/guide lug $48_i$ elsewhere along the mid-roller's radius. The greater the radial distance from the point of matched velocities, the greater the relative difference between the tangential velocity of the mid-roller $28_i$ and the drive/guide lug $48_i$ will be.

A region R5 represents a region where contact may occur between the side surface $81_1$ of the drive/guide lug $48_i$ and the inner lateral surface 93 of the mid-roller $28_i$ where the velocity of the drive/guide lug $48_i$ and the tangential velocity of the mid-roller $28_i$ are not matched. The tangential velocity of the mid-roller $28_i$ where the region R5 is located is smaller than the velocity of the drive/guide lug $48_i$. Due to a difference in velocities between the side surface $81_1$ of the drive/guide lug $48_i$ and the inner lateral surface 93 of the mid-roller $28_i$ in the region R5, the region R5 is subject to friction. This friction may cause generation of heat in the region R5, causing the deleterious effects of heat mentioned above. Furthermore, the friction at the region R5 may also cause the accelerated wearing of the drive/guide lug $48_i$ at that region.

While the above example relates to the interaction between the drive/guide lug $48_i$ and the mid-roller $28_i$, a similar interaction may take place when the drive/guide lug $48_i$ contacts the laterally-opposite mid-roller $28_j$. Also, while the above example takes into account only a single mid-roller, similar forces or other effects may be experienced by the drive/guide lug $48_i$ as it contacts other wheels, such as other ones of the mid-rollers $28_1$-$28_8$, the front idler wheel 26 or the drive wheel 24. As such, the geometry and/or location of the various regions of the drive/guide lug $48_i$ discussed herein may vary depending upon the other wheels that the drive/guide lug $48_i$ contacts.

The above examples of forces and other effects on the drive/guide lug $48_i$ and of the regions affected by such forces and other effects are presented for purposes of illustration only and should not be interpreted in any limiting way since there may be a large number of forces and other effects affecting drive/guide lugs $48_1$-$48_N$ that may depend upon a wide variety of factors.

Determination of regions of the drive/guide lugs $48_1$-$48_N$ undergoing particular stresses, strains and other effects (e.g., compression, tension, shear, friction, heating, abrasion, chunking, etc.) can be done by various tests and/or analysis techniques (e.g., painting a drive/guide lug $48_i$ to identify contact areas with the wheels 24, 26, $28_1$-$28_8$; placing load cells on a drive/guide lug $48_i$ to measure loads in different regions; performing finite element analysis (FEA) or other computational analysis on a virtual model of a drive/guide lug $48_i$; etc.).

In order to address their susceptibility to wear or other deterioration, the drive/guide lugs $48_1$-$48_N$ can be designed to enhance their resistance to wear or other deterioration or otherwise enhance their performance. This can be achieved in various ways in various embodiments, examples of which will now be discussed.

1. Drive/Guide Lug with a Material Distribution Profile

In some embodiments, a drive/guide lug $48_i$ may be characterized by a material distribution profile to enhance its resistance to wear or other deterioration or otherwise enhance its performance. With additional reference to FIG. 6B, the material distribution profile is designed such that the drive/guide lug $48_i$ has a material composition defining an arrangement of zones $105_1$-$105_Z$ of different materials. Different materials are materials which belong to different classes of materials (i.e., metals, polymers, ceramics and composites) and/or which exhibit substantially different values of a given material property (e.g., a modulus of elasticity, tensile strength, hardness, friction coefficient, crack growth resistance, etc.). The arrangement of zones $105_1$-$105_Z$ is designed into the drive/guide lug $48_i$. That is, the arrangement of zones $105_1$-$105_Z$ does not occur by chance (e.g., during manufacturing or use of the drive/guide lug $48_i$), but is rather achieved by a careful material selection and distribution within the drive/guide lug $48_i$ during design of the endless track 22.

The arrangement of zones $105_1$-$105_Z$ of the drive/guide lug $48_i$ may be provided for various purposes. For example, in some embodiments, the arrangement of zones $105_1$-$105_Z$ may be provided to create a desired variation in one or more material properties (e.g., modulus of elasticity) across the drive/guide lug $48_i$. As another example, in some embodiments, one or more of the zones $105_1$-$105_Z$ may be provided to implement a dedicated function, such as a wear indicator to indicate a level of wear of the drive/guide lug $48_i$ or a sacrificial piece used during break-in of the endless track 22. Examples of the arrangement of zones $105_1$-$105_Z$ in various embodiments are discussed below.

The zones $105_1$-$105_Z$ of the material distribution profile of the drive/guide lug $48_i$ may be provided in any suitable way using one or more manufacturing processes, such as, for example, a molding process (e.g., an injection molding process, a compression molding process, etc.), an extrusion process (e.g., a coextrusion process), a pouring process, a gluing process, a coating process, a heat treatment, a penetrating treatment (e.g., an electromagnetic radiation treatment, etc.), and/or any other suitable manufacturing process. Examples of how the zones $105_1$-$105_Z$ may be provided in various embodiments are discussed below.

The arrangement of zones $105_1$-$105_Z$ may comprise two, three, four, five or more zones of different materials, as further discussed below. Also, while the arrangement of zones $105_1$-$105_Z$ may comprise any selection of different materials, in some embodiments, the arrangement of zones $105_1$-$105_Z$ may comprise a plurality of zones of different elastomeric materials (i.e., two, three, four, five or more zones of different elastomeric materials). For example, such different elastomeric materials may include different rubbers, thermoplastic elastomers (TPE) such as polyurethane elastomers, and/or other elastomers.

a) Property Variation Profile

In some embodiments, the arrangement of zones $105_1$-$105_Z$ may be configured such that the drive/guide lug $48_i$ exhibits a desired property variation profile, i.e., a desired variation of one or more material properties across the arrangement of zones $105_1$-$105_Z$. This variation of one or more material properties is "desired" in that it is designed into the drive/guide lug $48_i$ by the careful material selection and distribution within the drive/guide lug $48_i$ to create the arrangement of zones $105_1$-$105_Z$ during design of the endless track 22 such that a material property varies in an intended manner. In that sense, this desired variation of one or more material properties can also be referred to as a "selected", "predetermined", "intended" or "controlled" variation of one or more material properties.

An example of a material property is a modulus of elasticity. For a purely elastic material, the modulus of elasticity can be taken as an elastic modulus (e.g., Young's modulus) of the material. For a viscoelastic material, the modulus of elasticity can be taken as a "complex modulus" of the material, which has two components: a storage modulus E', which relates to the material's elastic behavior and thus to energy stored in the material under stress; and a loss modulus E", which relates to the material's viscous behavior and thus to energy dissipated by the material as heat under stress. The complex modulus may be evaluated using dynamic mechanical analysis (DMA) (e.g., based on a standard test such as ATSM D4065, D4440 or D5279). The magnitude of the complex modulus may be evaluated as the square root of the sum of the squares of its components, i.e., $\approx(E'^{2}+ E''^{2})$. The complex modulus is well known and will therefore not be discussed further.

Other examples of material properties include a hardness, a strength (e.g., a tensile strength, a compressive strength, a shear strength, a yield strength, or a fatigue strength), an abrasion resistance, a crack growth resistance such as a crack growth rate (e.g., in mm per number of cycles, evaluated for instance using a pure-shear crack growth test), a coefficient of friction relative to another material, a heat conductivity, a coefficient of thermal expansion, a mass density, color, a resistance to degradation from UV or other radiation, etc. Various other mechanical, thermal, electrical or optical properties may be considered in other cases. Other types of properties such as self-healing qualities may also be considered material properties and may confer a particular characteristic to a zone $105_1$.

A material property may be substantially constant over a useful life of the drive/guide lug $48_i$. Alternatively, a material property may vary according to a variation of one or more physical parameters and/or may vary over time. For example, a particular material may be characterized by a particular modulus of elasticity that is substantially constant, while another material may be characterized by a modulus of elasticity that varies as a function of temperature, age or other factors. In some cases, a material property may temporarily change as a function of a physical parameter. In other cases, a material property may permanently change as a function of a physical parameter and/or time (e.g. a material that hardens over time, a material whose modulus of elasticity permanently changes if a certain temperature is reached, etc.). A material property can thus be considered or measured when the endless track 22 is new and ready to be used on the vehicle 10 under normal operating conditions in which the track 22 is expected to be used.

For purposes of example, in embodiments discussed below, the property variation profile defined by the material distribution profile of the drive/guide lug $48_i$ includes a variation of the modulus of elasticity across the arrangement of zones $105_1$-$105_Z$ of the drive/guide lug $48_i$.

For instance, in some embodiments, the modulus of elasticity may increase inwardly, i.e., in a direction towards an inmost point of the drive/guide lug $48_i$. For example, in some cases, an outer zone of the drive/guide lug $48_i$ may have a lower modulus of elasticity (i.e., higher elasticity)

than an inner zone of the drive/guide lug $48_i$. Thanks to the low modulus of elasticity near the periphery of the drive/guide lug $48_i$, compressive forces applied on the drive/guide lug $48_i$, for instance by the drive bars $52_1$-$52_B$ of the drive wheel 24 and/or by the mid-rollers $28_1$-$28_8$, may be absorbed by elastic deformation of the drive/guide lug $48_i$ near its exterior by the higher elasticity of the material of the drive/guide lug $48_i$ near its exterior. This may prevent or at least impede crack propagation within the drive/guide lug $48_i$ by reducing a potential for crack propagation within the drive/guide lug $48_i$. While absorption of the impact and/or compressive forces applied to the drive/guide lug $48_i$ may reduce cracking potential, excessive deformation of the drive/guide lug $48_i$ may cause excessive strain on the drive/guide lug $48_i$ that may lead to other problems. The higher modulus of elasticity of the material deeper within the drive/guide lug $48_i$ serves to rigidify the drive/guide lug $48_i$ and thus prevent excessive deformation thereof. This may therefore further prevent or at least impede cracking and/or other negative effects.

While in embodiments discussed below the property variation profile defined by the material distribution profile includes a variation of the modulus of elasticity across the arrangement of zones $105_1$-$105_Z$ of the drive/guide lug $48_i$, the property variation profile may include a variation of one or more other material properties in addition to or instead of a variation of the modulus of elasticity in other embodiments. Examples of such other material properties are mentioned above.

The property variation profile defined by the arrangement of zones $105_1$-$105_Z$ of the drive/guide lug $48_i$ may be configured in various ways. For example, in various embodiments, the property variation profile may include one or more gradients of modulus of elasticity across three or more zones, where each gradient can be a discrete gradient or a continuous gradient.

i. Discrete Gradient

In some embodiments, the property variation profile defined by the arrangement of zones $105_1$-$105_Z$ of the drive/guide lug $48_i$ may include a discrete gradient of modulus of elasticity. A discrete gradient of modulus of elasticity is a discrete variation of the modulus of elasticity in a specified direction across the arrangement of zones $105_1$-$105_Z$ of the drive/guide lug $48_i$. In such embodiments, adjacent ones of the zones $105_1$-$105_Z$ which define the discrete gradient of modulus of elasticity are discrete zones such that the modulus of elasticity varies in discrete steps across the drive/guide lug $48_i$. A zone is "discrete" in that its dimension along the specified direction of the discrete gradient is macroscopically measurable.

Figure 10A:
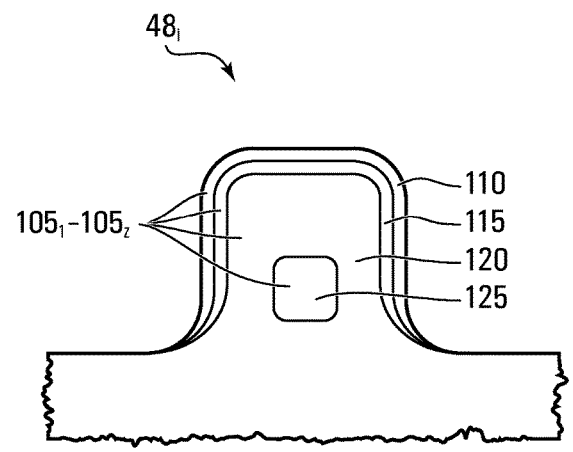
Figure 10B:
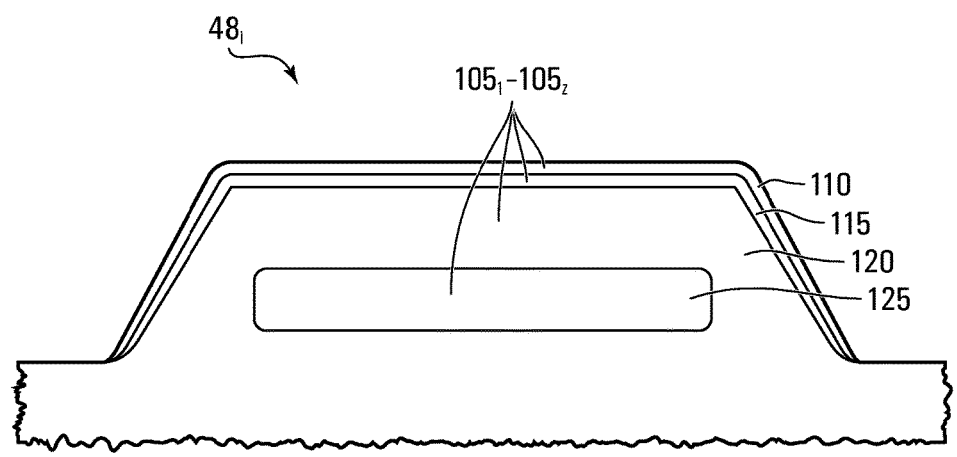

For example, FIGS. 10A and 10B show an example of an embodiment in which the modulus of elasticity varies in discrete steps such that the zones $105_1$-$105_Z$ have different modulus of elasticity values.

In this embodiment, the arrangement of zones $105_1$-$105_Z$ includes an outer zone 110, a mid zone 115, an inner zone 120 and a core zone 125. The mid zone 115, the inner zone 120 and the core zone 125 are entirely contained within the drive/guide $48_i$ lug such that each of the mid zone 115, the inner zone 120 and the core zone 125 is spaced from the periphery of the drive/guide lug $48_i$. The outer zone 110 is disposed over and astride the mid-zone 115 which is beneath the outer zone 110, and the mid-zone 115 is disposed over and astride the inner zone 120 which is beneath the mid-zone 115. In this example, each of the zones 110, 115 comprises a top portion and a plurality of side portions that extend from the top portion, terminate adjacent to a base of the drive/guide lug $48_i$ and contain therebetween a respective one of the zones 115, 120 that is beneath it. The side portions of the mid zone 115, the inner zone 120 and the core zone 125 respectively extend substantially parallel to side surfaces of the drive/guide lug $48_i$. The top portion of each of the mid zone 115, the inner zone 120 and the core zone 125, extends substantially parallel to a top surface of the drive/guide lug $48_i$. In this example, each of the zones 110, 115 is shaped substantially as a scaled-down version of the periphery of the drive/guide lug $48_i$, and/or is generally U-shaped in a cross-section of the drive/guide lug $48_i$ taken in the longitudinal direction of the track 22. In this example, the outer zone 110 terminates within the drive/guide lug $48_i$ in the cross-section of the drive/guide lug $48_i$ taken in the longitudinal direction of the track 22. In this example, the outer zone 110 has a lower modulus of elasticity (i.e., a higher elasticity) than the mid zone 115, which has a lower modulus of elasticity than the inner zone 120, which has a lower modulus of elasticity than the core zone 125. Thus, the compressive forces applied to the outside of the drive/guide lug $48_i$ can be absorbed by elastic deformation of the outer zone 110 and the mid zone 115 while the inner zone 120 and the core zone 125 can provide more rigidity.

For instance, in some embodiments, the outer zone 110, the mid zone 115, the inner zone 120 and the core zone 125 may be made of different elastomeric materials (e.g., rubbers, thermoplastic elastomers (TPE) such as polyurethane elastomers, and/or other elastomers).

The elastomeric material of the outer zone 110 has a lower modulus of elasticity than the elastomeric material of the mid zone 115. Thus, the elastomeric material of the outer zone 110 is more elastic (i.e., has greater elasticity) than the elastomeric material of the mid zone 115 and is disposed between the periphery of the drive/guide lug $48_i$ and the elastomeric material of the mid zone 115. Conversely, the elastomeric material of the mid zone 115 is stiffer than the elastomeric material of the outer zone 110 and is disposed behind the elastomeric material of the outer zone 110.

The elastomeric material of the outer zone 110 is susceptible to elastically deforming upon application of a force, such as by contracting inwards thereby absorbing part of the applied force. This may prevent or at least impede crack propagation within the drive/guide lug $48_i$ (e.g., when it contacts the sprocket bars $52_1$-$52_B$ of the drive wheel 24). Also, since it is exposed to the wheels 24, 26, $28_1$-$28_6$ and the environment of the track assembly $16_i$, the elastomeric material of the outer zone 110 may have a lower coefficient of friction with the wheels 24, 26, $28_1$-$28_6$ and/or a higher abrasion resistance than the elastomeric material of the mid zone 115. For instance, in some cases, the elastomeric material of the outer zone 110 may be a polyurethane elastomer.

While the modulus of elasticity of the elastomeric material of the outer zone 110 may be lower than that of the elastomeric material of the mid zone 115 in some embodiments, this may not be the case in other embodiments (e.g., in embodiments in which the outer zone 110 is based on a polyurethane elastomer which does not necessarily have a lower modulus of elasticity than the elastomeric material of the mid zone 115, but is rather used for its greater abrasion resistance than the elastomeric material of the mid zone 115).

To prevent excessive deformation of the drive/guide lug $48_i$ and resultant cracking or other undesirable effects, higher modulus zones are provided deeper inside the drive/guide lug $48_i$ to give the drive/guide lug $48_i$ a more rigid skeleton. To this end, the mid zone 115 and the inner zone 120 may have successively higher modulus of elasticity values (i.e., less elasticity). The mid zone 115 may receive some of the force transferred through the outer zone 110 and deform to absorb part of the force transferred through the outer zone 110. By deforming, the mid zone 115 may absorb some of the force applied to the outer surface of the drive/guide lug $48_i$, yet by being less elastic, the mid zone 115 strains less easily than the outer zone 110, thereby reducing the overall deformation of the drive/guide lug $48_i$. The inner zone 120 may have a fairly high modulus of elasticity in order to further rigidify the drive/guide lug $48_i$ and prevent excessive deformation thereof.

For instance, in some embodiments, the mid zone 115 and the inner zone 120 may be made of different types of rubber such that the rubber of the mid zone 115 has a lower modulus of elasticity than the rubber of the inner zone 120. The higher modulus of elasticity of the rubber of the inner zone 120 compared to that of the rubber of the mid zone 115 may be achieved in various ways, such as, for example: by having a greater concentration of carbon black in the rubber of the inner zone 120 than in the rubber of the mid zone 115; by having a greater content of dienes in the rubber of the inner zone 120 than in the rubber of the mid zone 115; by having a greater content of sulfur or other vulcanizing agent in the rubber of the inner zone 120 than in the rubber of the mid zone 115; by having the rubber of the inner zone 120 and the rubber of the mid zone 115 based on different base polymers; by adding a polymeric resin; and/or by using any other suitable technique.

The elastomeric material of the core zone 125 may have a highest modulus of elasticity (i.e., lowest elasticity) of the drive/guide lug $48_i$ to serve as reinforcement to prevent deformation of the drive/guide lug $48_i$. For instance, in some cases, the elastomeric material of core zone 125 may be a rubber with a high modulus of elasticity.

In other embodiments, one or more of the outer zone 110, the mid zone 115, the inner zone 120 and the core zone 125 may be made of other types of materials, including non-elastomeric materials.

For example, in some embodiments, the outer zone 110 may be made of thermoplastic olefin (TPO), nylon, polytetrafluoroethylene (PTFE) or any other thermoplastic material or other material with a suitable low coefficient of friction and/or high abrasion resistance.

As another example, in some embodiments, the core zone 125 may be made of metal, rigid polymer (e.g., thermoplastic), ceramic or any other material with a suitable rigidity. For instance, in some cases, the core zone 125 may comprise an insert (e.g., of metal, rigid polymer or ceramic) over which the rubber of the inner zone 120 is molded.

As yet another example, in some embodiments, two (2) or more of the outer zone 110, the mid zone 115, the inner zone 120 and the core zone 125 may be made of a common elastomeric base in which are dispersed chopped fibers (e.g., carbon fibers, nylon fibers, Kevlar™, etc.) such that a concentration of the chopped fibers varies between these two or more zones, which thereby constitute zones of different elastomeric materials. For instance, in some cases, the outer zone 110, the mid zone 115, the inner zone 120 and the core zone 125 may be made of rubber containing chopped Kevlar™ fibers or other suitable chopped fibers in which the concentration of chopped fibers decreases in the direction from the core zone 110 towards the outer zone 110 to reduce the modulus of elasticity in that direction.

The material distribution profile of the drive/guide lug $48_i$ featuring the arrangement of zones $105_1$-$105_Z$ that define the modulus of elasticity variation may thus reduce a potential for crack propagation and thus reduce wear and increase the life of the drive/guide lug $48_i$.

Although a particular material distribution profile is shown in the above embodiment for illustrative purposes to show an example of the arrangement of zones $105_1$-$105_Z$, various other different material distribution profiles may be realized in other embodiments to create various other arrangements of zones $105_1$-$105_Z$ by varying a number of zones, sizes, geometries and locations of zones, and/or materials of the zones. For instance, while in the above embodiment there are four (4) zones of which the outer zone 110 and the mid zone 115 are layered zones shaped like layers covering the inner zone 120 while the core zone 125 is shaped like a reinforcement bar or block reinforcing the drive/guide lug $48_i$, in other embodiments, the number of zones and the geometry of the zones may be varied. For example, in some embodiments, fewer zones $105_1$-$105_Z$ may be provided to reduce the complexity or cost of manufacture of the drive/guide lug $48_i$ (e.g., core zone 125 or mid zone 115 may be omitted), or more zones $105_1$-$105_Z$ may be provided to achieve a more complex property variation profile.

Also, although in the above embodiment the zones $105_1$-$105_Z$ are characterized by certain values of modulus of elasticity, in some embodiments, other property constraints may also be taken into consideration in selecting the types of materials that may be used in each zone. For example, although a high modulus of elasticity may be desired for the inner zone 120, a certain minimum acceptable fatigue strength may also apply in to inner zone 120 and/or in other zones.

By selecting a number of zones, sizes, geometries and locations of zones, and/or materials of the zones, it is possible to regulate how the modulus of elasticity changes across the arrangement of zones $105_1$-$105_Z$ of the drive/guide lug $48_i$. In the above embodiment, the modulus of elasticity varies across the drive/guide lug $48_i$ in three (3) discrete steps, the transitions between which correspond to the transitions between the zones $105_1$-$105_Z$. There may be two (2), four (4), five (5) or more (e.g., 10 or 20) discrete steps in other embodiments. By providing a large number of zones $105_1$-$105_Z$ having different modulus of elasticity values, it is possible to approximate a smooth variation in modulus of elasticity, the actual granularity of which will depend upon the number and size of the zones $105_1$-$105_Z$.

Figure 11A:
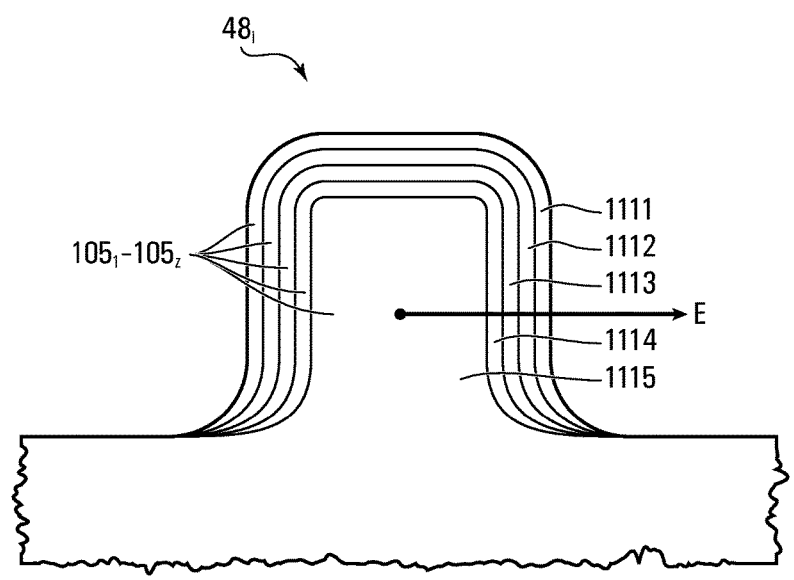
Figure 11B:
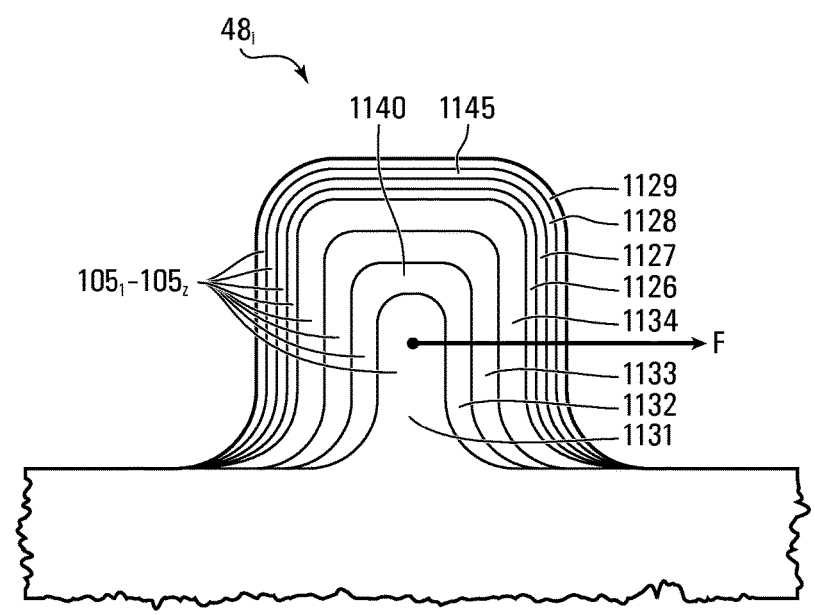

FIGS. 11A and 11B shows other examples of embodiments of a drive/guide lug $48_i$ in which the modulus of elasticity varies in discrete steps such that the zones $105_1$-$105_Z$ have different modulus of elasticity values.

More particularly, FIG. 11A shows an embodiment in which the zones $105_1$-$105_Z$ of the drive/guide lug $48_i$ comprise a core zone 1115 and a plurality of layered zones, including a first layered zone 1111, a second layered zone 1112, a third layered zone 1113 and a fourth layered zone 1114, which make up a layered area 1120. In this example, the layered zones 1111, 1112, 1113, 1114 are approximately equal in thickness. Different ones of the layered zones may have different thicknesses in other examples.

Figure 12A:
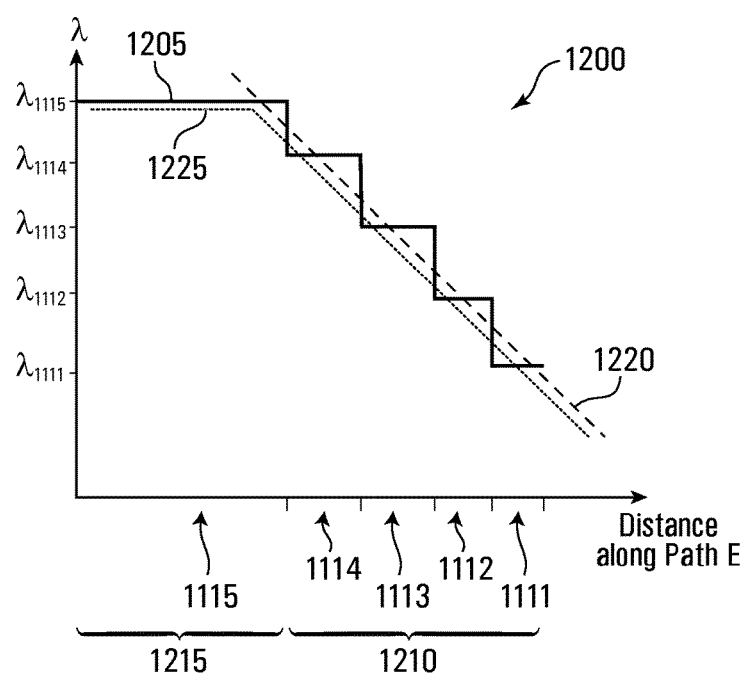
FIGS. 12A, 12B and 18B show different examples of a variation of a material property across an arrangement of different materials of an inner lug of the endless track.

FIG. 12A is a graph 1200 showing an example of how the modulus of elasticity 1205 of the drive/guide lug $48_i$ varies as a function of distance within the drive/guide lug $48_i$ in a specified direction represented by line E shown in FIG. 11A, according to the embodiment illustrated in FIG. 11A. As the distance along line E is varied, the modulus of elasticity of the drive/guide lug $48_i$ takes on five (5) different values $\lambda_{1115}$, $\lambda_{1114}$, $\lambda_{1113}$, $\lambda_{1112}$ and $\lambda_{1111}$, each of which correspond to the modulus of elasticity of the material of a respective one of the zones 1115, 1114, 1113, 1112 and 1111. As such, the function of the modulus of elasticity 1205 of takes the form of a step function, each step corresponding to a respective one of the zones $105_1$-$105_Z$. The layered zones 1111, 1112, 1113, 1114 are represented in range 1210 of the graph 1200, while range 1215 represents the core zone 1115. In range 1210, the modulus of elasticity of the drive/guide lug $48_i$ approximates a linear function 1220. As such, the layered area 1120 can be viewed as exhibiting an approximately linear variation in modulus of elasticity with an actual granularity defined by the steps in the function of the modulus of elasticity 1205 corresponding to the layered zones 1114, 1113, 1112 and 1111. The overall function modulus of elasticity 1205 across line E in this example can thus be considered to approximate smooth line 1225.

In this example, the values of modulus of elasticity $\lambda_{1115}$, $\lambda_{1114}$, $\lambda_{1113}$, $\lambda_{1112}$ and $\lambda_{1111}$ vary from one zone to the next by approximately the same value, giving steps of approximately equal height in the vertical direction of the graph 1200. Similarly, the layered zones 1111, 1112, 1113, 1114 have approximately equal thicknesses such that the steps have approximately equal width in the horizontal (distance along line E) direction of the graph 1200. The linear function 1220 which is approximated by the function of the modulus of elasticity 1205 in the layered area 1120 can be varied by altering the thicknesses of the layered zones 1111, 1112, 1113, 1114 and/or by varying the modulus of elasticity values $\lambda_{1115}$, $\lambda_{1114}$, $\lambda_{1113}$, $\lambda_{1112}$ and $\lambda_{1111}$ of the layered zones 1111, 1112, 1113, 1114. For example, the rate of change (slope) of the approximated linear function 1220 may be decreased by increasing the thickness or decreasing the variation in the modulus of elasticity in the different zones.

The manner in which approximation of a function is determined may affect the thicknesses of the zones $105_1$-$105_Z$ required to approximate the function. For example, in some embodiments, the linear function 1220 may be arrived at by taking a weighted average of the modulus of elasticity values $\lambda_{1115}$, $\lambda_{1114}$, $\lambda_{1113}$, $\lambda_{1112}$ and $\lambda_{1111}$ of each zone, wherein the thickness of each zone determines the weight, and dividing the result by the average thickness of a zone. This may provide the slope of the linear function 1220. Other models may be used in other embodiments to approximate functions of variation of a material property depending on the method used.

Depending on the materials available, on the modulus of elasticity of available materials, and on the inter-compatibility of materials from which the drive/guide lug $48_i$ may be made, it may not practical in some embodiments to obtain equidistant moduli of elasticity for each of the zones $105_1$-$105_Z$. As such, in some cases, the materials used or available may not provide equal heights for each step in the function of the modulus of elasticity 1205. In such cases, the thicknesses of the zones $105_1$-$105_Z$ may be modified to adjust the weight of each zone such that, on average, the linear function 1220 is still approximated. This would have the effect of altering the horizontal length of the steps in the graph 1200 to compensate for inequality in the vertical height of the steps, so as to achieve an approximation of linear function 1220. Alternatively, the modulus of elasticity of other zones may be adjusted, insofar as possible or practical, such as to approximate the linear function 1220. This would have the effect of varying the vertical height of steps in the graph 1200 to compensate for another step that is too tall or too short so as to approximate the linear function 1220.

In this embodiment, the arrangement of zones $105_1$-$105_Z$ has been selected based on modulus of elasticity values so as to achieve an approximation, according to a selected curve-fitting method, of the linear function 1220. In other embodiments, the modulus of elasticity variation may be a nonlinear variation of a function of distance within the drive/guide lug $48_i$. In yet other embodiments, there may be no approximation of a linear or other function. For example, in some embodiments, it may simply be desired to achieve a certain modulus of elasticity value in a central portion of the drive/guide lug $48_i$ to prevent excessive deformation of the drive/guide lug $48_i$ and to achieve certain other modulus of elasticity values in other areas of the drive/guide lug $48_i$ to allow absorption of forces applied to the drive/guide lug $48_i$. In such embodiments, the various materials for the zones $105_1$-$105_Z$ may be selected on the basis of the desired modulus of elasticity in each zone, without regards to any linear or other function.

FIG. 11B shows another example of an embodiment of a drive/guide lug $48_i$ in which the modulus of elasticity varies in discrete steps such that the zones $105_1$-$105_Z$ have different modulus of elasticity values. In this embodiment, an entirety of the drive/guide lug $48_i$ is made up of zones $105_1$-$105_Z$ that may be considered layered zones. Also, in this embodiment, the drive/guide lug $48_i$ comprises an inner area 1140 where the zones $105_1$-$105_Z$ form thicker layers 1131, 1132, 1133, 1134 and an outer area 1145 where the zones $105_1$-$105_Z$ form thinner layers 1126, 1127, 1128, 1129.

Figure 12B:
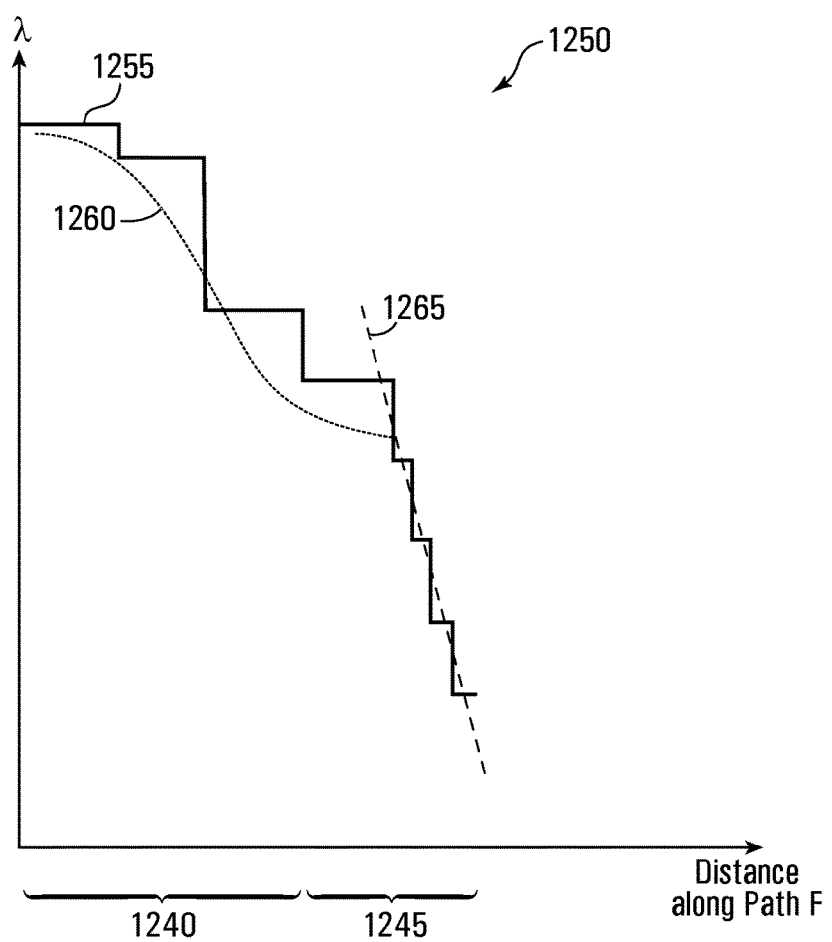

FIG. 12B shows a graph 1250 showing the function of the modulus of elasticity 1255 of the drive/guide lug $48_i$ as it varies along line F shown in FIG. 11B, according to the embodiment illustrated in FIG. 11B. In this example, the modulus of elasticity decreases in successive ones of the zone $105_1$-$105_Z$ along the line F. Also, in this example, due to the discrete nature of the zones $105_1$-$105_Z$, the function of the modulus of elasticity 1255 still features steps, however the steps are not of equal size.

A first range 1240 of the graph 1250 represents the thicker layers 1131, 1132, 1133, 1134 in the inner area 1140 of the drive/guide lug $48_i$. These thicker layers 1131, 1132, 1133, 1134 do not vary equally. In particular, the two first thicker layers 1131 and 1132 have a particularly high modulus of elasticity and represent a particularly inelastic core of the drive/guide lug $48_i$. Subsequent thicker layers 1133 and 1134 have approximately the same thickness as the two first thicker layers 1131 and 1132, but they have significantly lower moduli of elasticity. In the inner area 1140, the variation of modulus of elasticity is not equal amongst the different zones, and the function of the modulus of elasticity 1255 in this first range 1240 approximates a polynomial function 1260. In this case, the materials of the thicker zones 1131, 1132, 1133, 1134 have been selected so as to achieve an approximation, according to a selected curve-fitting method, of the polynomial function 1260. In other cases, it may not be necessary or desired to approximate a linear, polynomial, or other function. For example, the materials of the thicker zone 1131, 1132, 1133, 1134 may simply be selected on the basis of a desired modulus of elasticity in their respective areas.

A second range 1245 of the graph 1250 represents the thinner layers 1126, 1127, 1128, 1129. These thinner layers are in the outer area 1145 of the drive/guide lug $48_i$ and provide a reduced modulus of elasticity region for absorbing forces applied to the drive/guide lug $48_i$. While a lower modulus of elasticity may be desired towards the exterior of the drive/guide lug $48_i$, it may be desired to avoid strong discontinuities, that is, large differences, in the modulus of elasticity of adjacent ones of the zones $105_1$-$105_Z$. In particular, it may be desired to avoid having a relatively highly elastic zone adjacent a relatively inelastic zone to avoid a stress concentration at the interface between these zones, which could lead to cracking or tearing at the interface between these zones. In this example, strong discontinuities are avoided by providing four thinner layers 1126, 1127, 1128, 1129 varying in modulus of elasticity from a first value $\lambda_{1126}$ that is near the modulus of elasticity of the adjacent thicker zone 1134 gradually to a fourth value $\lambda_{1129}$ at the outermost thinner zone 1129. The function of the modulus of elasticity 1255 in the second range 1245 decreases as a step function with relatively equal steps which approximate a linear function 1265. Again, the function 1255 in the second range 1245 need not have equal-sized steps and may not necessarily approximate a linear or other function.

In the above example, two areas 1140, 1145 of the drive/guide lug $48_i$ correspond to two regions 1240, 1245 of the graph approximating different functions. In other examples, a single function (linear, polynomial or other) may be approximated by the entire function of the modulus of elasticity 1255. For example, if the thicker layers 1131, 1132, 1133, 1134 have an approximately corresponding step size in the function 1255, the thinner layers 1126, 1127, 1128, 1129 may be characterized by variations in modulus of elasticity yielding step sizes proportional to their thinner area such that the zones $105_1$-$105_Z$ together yield a step function that approximates a straight line.

In the embodiments considered above, the modulus of elasticity varies by decreasing from the inside outwards. Other variations are realizable in other embodiments. For example, in some embodiments, if it is desired to have a higher modulus of elasticity towards the outside of the drive/guide lug $48_i$, zones $105_1$-$105_Z$ may similarly be provided but with the materials in each zone having an increasing modulus of elasticity towards the outside of the drive/guide lug $48_i$. As another example, in some embodiments, successive ones of the zones $105_1$-$105_Z$ from the inside to the outside of the drive/guide lug $48_i$ may not have an ever-increasing or ever-decreasing modulus of elasticity. Rather, the modulus of elasticity may increase and then decrease, or vice versa, in a direction from the center of the drive/guide lug $48_i$ towards the outside so as to create zones having higher or lower modulus of elasticity values than their neighboring zones.

In some of the embodiments considered above, the zones $105_1$-$105_Z$ are layered zones disposed on all sides of the drive/guide lug $48_i$. In other embodiments, the layered zones may be provided only on one part of the drive/guide lug $48_i$, such as for example only on one side thereof. Also, in other embodiments, the zones $105_1$-$105_Z$ may take forms other than layers (e.g., blocks, bars or plates).

Figure 13A:
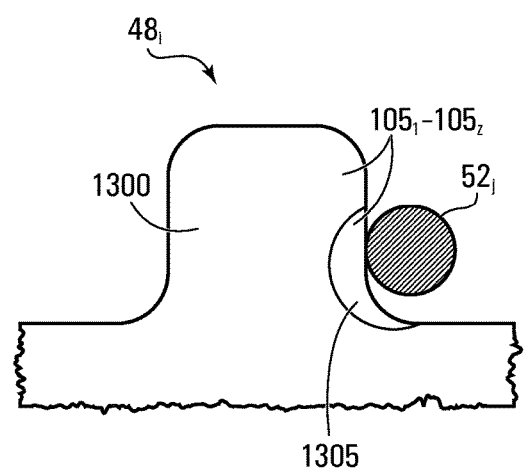
Figure 13B:
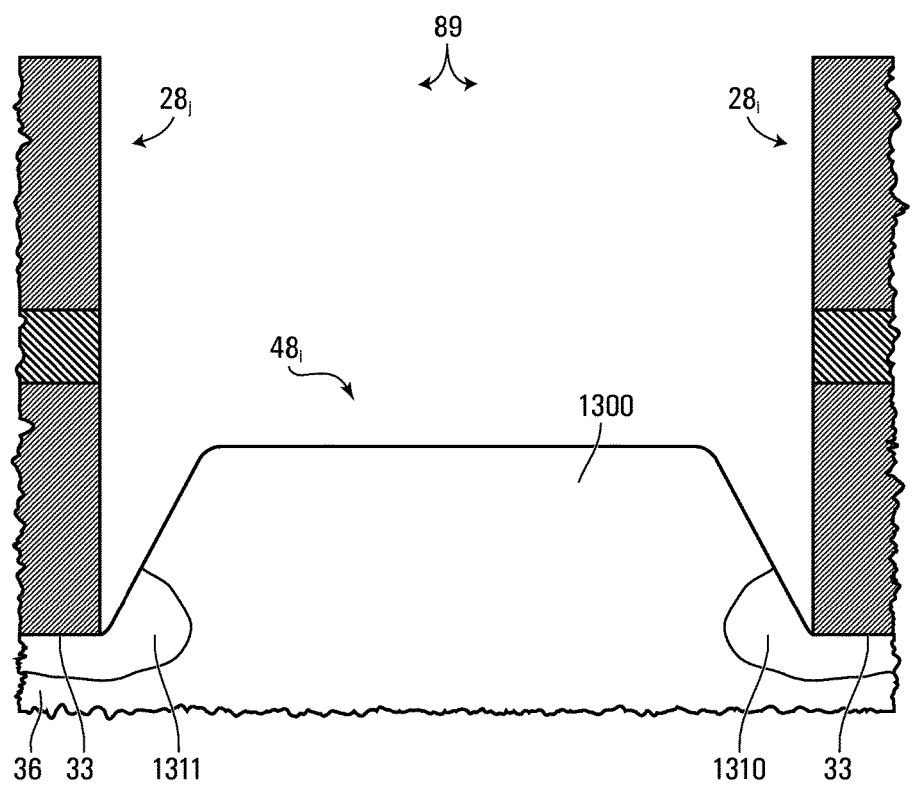

FIGS. 13A and 13B show another example of an embodiment of a drive/guide lug $48_i$ in which the modulus of elasticity varies in discrete steps such that the zones $105_1$-$105_Z$ have different modulus of elasticity values. In this embodiment, the drive/guide lug $48_i$ comprises a first zone 1300 which makes up a majority of the drive/guide lug $48_i$ and a second zone 1305 located where a sprocket bar $52_i$ of the drive wheel 24 contacts the drive/guide lug $48_i$ and applies a force thereto. The second zone 1305 may correspond roughly to the region R1 shown in FIG. 8 and described above. The zone 1305 may be characterized by a lower modulus of elasticity than the zone 1300 such that the force applied by the sprocket bar $52_i$ may be better absorbed in the zone 1305. Because the sprocket bar $52_i$ is expected to contact the drive/guide lug $48_i$ on one side more often, the zone 1305 may be provided only on that side of the drive/guide lug $48_i$. Alternatively, in other cases, a zone similar to the zone 1305 may be symmetrically provided on the other side of the drive/guide lug $48_i$.

Turning now to FIG. 13B, a third zone 1310 is provided where a mid-roller $28_i$ is expected to exert a force upon the drive/guide lug $48_i$. The zone 1310 may correspond roughly to the region R4 shown in FIG. 9 and described above. In this example, the material of the zone 1310 may also extend beyond the drive/guide lug $48_i$ into the carcass 36 of the endless track 22. In particular, in this example, the material of the zone 1310 extends into the carcass 36 of the track 22 to cover at least part of the rolling path 33 of the inner side 45 of the track 22 on which the mid-roller $28_i$ rolls. Likewise, for layered material distribution profiles, such as those illustrated in FIGS. 11A and 11B, materials of certain layered zones may extend into the carcass 36 of the track 22.

As shown in FIG. 13B, in this case, a zone 1311 similar to the zone 1310 is provided on the other side of the drive/guide lug $48_i$ since conditions are expected to be symmetrically similar on both sides of the drive/guide lug $48_i$. Alternatively, in other cases, the zone 1310 could be continuous, forming for example a circle around the periphery of the drive/guide lug $48_i$ or a U shape around a portion thereof. Other configurations are possible in other cases.

In embodiments considered above, the property variation profile defined by arrangement of zones $105_1$-$105_Z$ of the drive/guide lug $48_i$ essentially pertains to variation of a single material property, in this case the modulus of elasticity. In other embodiments, the property variation profile defined by the arrangement of zones $105_1$-$105_Z$ of the drive/guide lug $48_i$ may be designed such as to result in a variation of more than one property across the drive/guide lug $48_i$.

Figure 14:
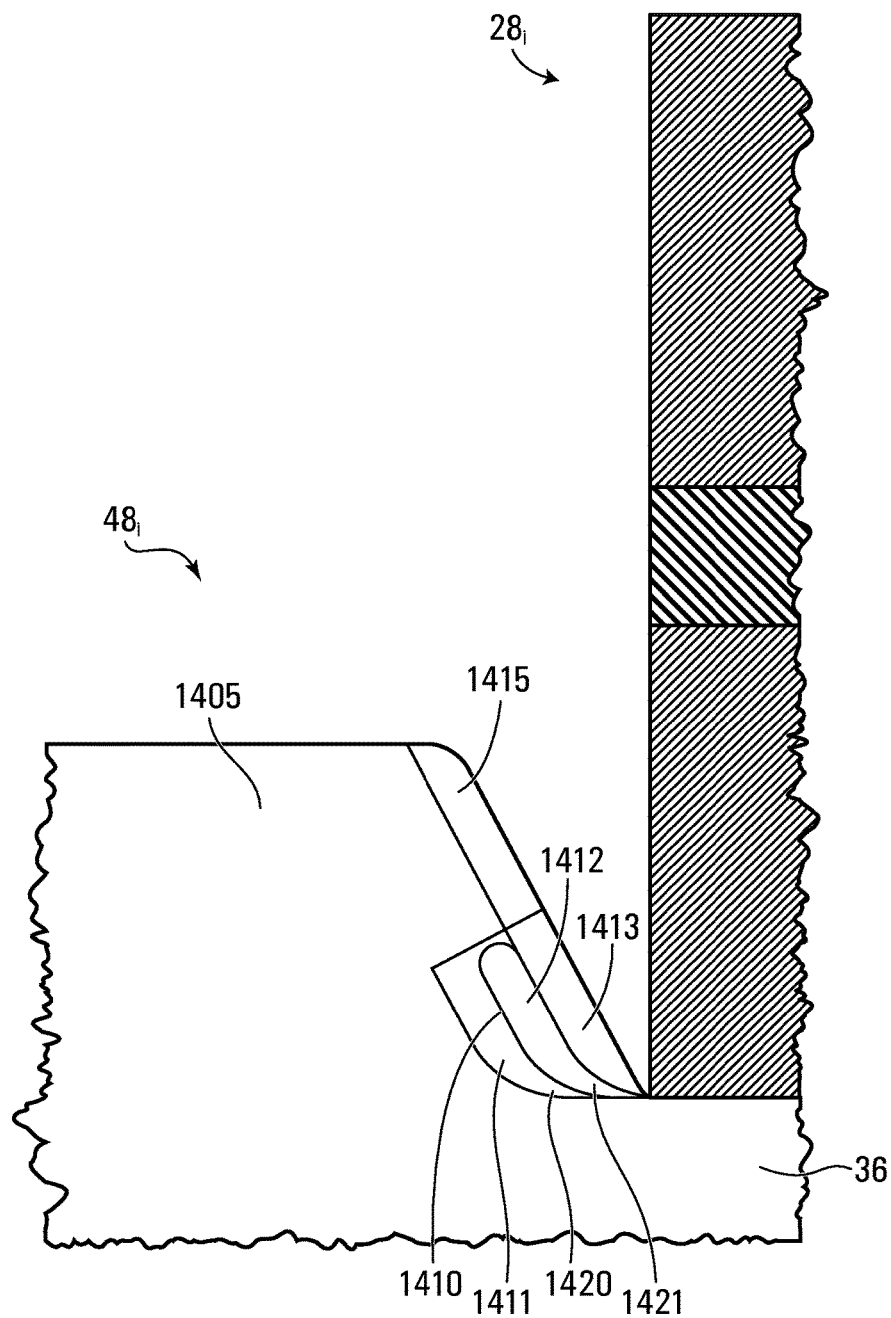

For example, FIG. 14 shows an embodiment of a drive/guide lug $48_i$ in which the arrangement of zones $105_1$-$105_Z$ defines a property variation profile that provides a variation in two properties. In this case, the arrangement of zones $105_1$-$105_Z$ of the drive/guide lug $48_i$ includes zones 1405, 1411, 1412, 1413 and 1415.

The zone 1405 makes up a majority of the drive/guide lug $48_i$, and may have a makeup similar to that of the zone 1300 of the example of FIGS. 13A and 13B.

The drive/guide lug $48_i$ also comprises a certain area 1410 wherein the material distribution profile provides a decrease in modulus of elasticity in a direction from the center of the lug towards the periphery of the lug. This may be realized by providing a single zone having a lower modulus of elasticity relative to the zone 1405 as was provided in the example of FIGS. 13A and 13B in the zones 1305 and 1310. However, in this example, the area 1410 is provided with the multiple zones 1411, 1412, 1413, each characterized by a different modulus of elasticity. More particularly, in this example, the modulus of elasticity of the zone 1411 is lower than that of the zone 1405; the modulus of elasticity of the zone 1412 is lower than that of the zone 1411; and the modulus of elasticity of the zone 1413 is lower than that of the zone 1412. As such, a layered profile with successively decreasing values of modulus of elasticity is achieved similarly to the examples of FIGS. 11A and 11B, but within the area 1410. This area 1410 of increased elasticity may therefore be provided where a force is expected to be applied to the drive/guide lug $48_i$ by the mid-roller $28_i$ such as to absorb such force. Advantageously, the reduction of modulus of elasticity may take place only in the area 1410 where the force is expected to be applied. In some cases, the area 1410 may be extended in the rolling path 33 of the carcass 36 of the track 22 under the mid-roller $28_i$ as with the area 1310 in the example of FIG. 13B.

In order to decrease the number of different inter-zone interfaces and to avoid strong property discontinuities (e.g., as would exist at an interface between the zone 1405 and the zone 1413, if such interface existed), in this embodiment, the zone 1411 has an outward flare 1420 that partially surrounds the zones 1412 and 1413 such that the zones 1412 and 1413 do not extend to the zone 1405 but touch only one another and/or the zone 1411. The zone 1412, to a lesser extent, also has a small flare 1421 to partially surround the zone 1413. As such, the zones 1410, 1411, 1412 and 1413 only contact other zones that are one modulus of elasticity value apart.

The zone 1415 is characterized by a low coefficient of friction between it and the mid-roller $28_i$. More particularly, it may be desired to have a low coefficient of friction in the zone 1415 since, as described above, there may be high frictional forces between the mid-roller $28_i$ and the drive/guide lug $48_i$. Accordingly, the zone 1415 may be characterized as having a low friction coefficient with material which makes up the mid-roller $28_i$ and which can contact the zone 1415. This material of the mid-roller $28_i$ may be a metal (e.g., steel), a low-friction polymer (e.g., polyurethane, ultra-high-molecular-weight polyethylene (UHMW), polytetrafluoroethylene (PTFE), etc.), or any other suitable material. For instance, in some cases, the coefficient of friction of the zone 1415 with the material of the mid-roller $28_i$ may be between 0.1 and 0.9. The zone 1415 may thus be made of a low-friction polymer such as polyurethane, UHMW, PTFE, etc. or any other suitable material. Although the zone 1415 is characterized by a low coefficient of friction with the material of the mid-roller $28_i$, it may also be subject to other property constraints. For example, while the modulus of elasticity may be of prime concern in the area 1410, there may still be a range of acceptable modulus of elasticity for the zone 1415 as well. Other property constraints may include a minimum fatigue strength and/or a maximum hardness.

Figure 15:
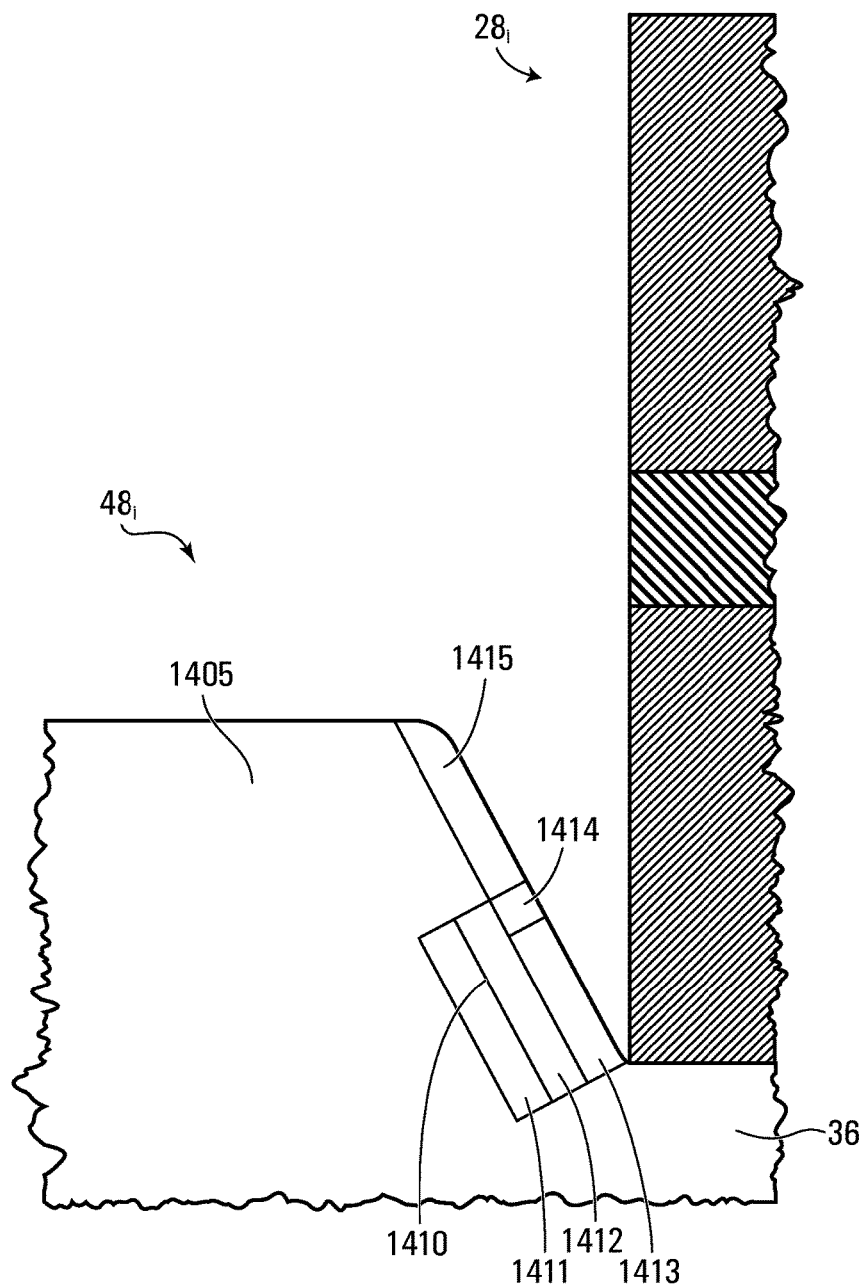

FIG. 15 shows a variation of the example of FIG. 14. Like numbered parts in FIGS. 14 and 15 represent similar elements, although the flanges 1420 and 1425 have been removed in FIG. 15 for simplicity.

Like in the example of FIG. 14, in this example, the drive/guide lug $48_i$ comprises the area 1410 where the material distribution profile provides a decrease in modulus of elasticity. This area 1410 comprises the zone 1413 characterized as having a certain low value modulus of elasticity. Also, in this example, the drive/guide lug $48_i$ comprises a zone 1414 characterized as having the same or slightly higher value of modulus of elasticity as zone 1413, but also characterized as having the same value of coefficient of friction of the zone 1415 with the mid-roller $28_i$. The properties of zone 1414 may be achieved by a particular material that may not be the same as the material of zones 1415 and 1413. For example, in some cases, TPO or polyurethane may be used in the zone 1415, a rubber may be used in the zone 1414, and another rubber with a lower modulus of elasticity may be used in the zone 1413. A zone characterized by two desired properties may not share values for those properties with adjacent zones as in the above example. For instance, the zone 1414 may be, in an alternate example, characterized by unique values of modulus of elasticity and coefficient of friction with the mid-roller $28_i$, or may even have been characterized by entirely different properties.

As mentioned above, certain material properties may be dependent upon certain physical factors and/or time. As such, when selecting a material distribution profile for the drive/guide lug $48_i$ with a view of providing a particular property variation profile, the material distribution profile may comprise different materials characterized by different properties wherein the difference in properties lies in the materials' behavior at certain ranges of a physical parameter such as temperature or after a certain time. For example, in some cases, the drive/guide lug $48_i$ may be expected to experience a broad range of temperatures in use (e.g., −30 to 90 degrees Celsius) and certain ones of its zones $105_1$-$105_Z$ may be characterized by a same modulus of elasticity at average ambient temperatures (e.g., 15-30 degrees Celsius) but have significantly different moduli of elasticity at higher or lower temperatures as may be experienced in high stress. In such cases, a particular zone $105_i$ may be strategically provided to increase resistance to wear in high stress situations. For example, if the track 22 is being put to excessive use, for instance by being used in excessively hot temperatures, for excessively high durations of time, on excessively demanding terrain, and/or with excessive debris ingestion in the track assembly $16_i$, and/or by being misaligned and/or driven excessively hard, as the temperature increases with the ensuing high stress, the drive/guide lug $48_i$ may have a tendency to deform more. This, in turn, may lead to premature wearing. However, if the material distribution profile of the drive/guide lug $48_i$ were designed principally with these excessive conditions in mind, it may not be optimally suited for use in regular conditions (e.g. it may be too inelastic) which in turn may lead to premature wearing. One solution is to provide within the drive/guide lug $48_i$ certain zones that are characterize by having certain property characteristics for physical parameters corresponding to excessive use. For example, support zones of material having lower elasticity at high temperatures may be provided within the drive/guide lug $48_i$ (e.g. as vertical strips, horizontal strips, x-shaped reinforcement, as layers or with other geometries) to provide support for the drive/guide lug $48_i$ at high temperatures.

Individual ones of the discrete zones $105_1$-$105_Z$ defining a discrete gradient of modulus of elasticity, such as those considered in the embodiments discussed above, may be provided in various ways.

For example, in some embodiments, individual ones of the zones $105_1$-$105_Z$ may be separate amounts of material which are provided separated and interconnected together. This may be done in various ways using various manufacturing processes. For instance, various molding processes may be used to make the drive/guide lug $48_i$ with its arrangement of zones $105_1$-$105_Z$. For example, in some embodiments, a compression molding process may be used in which different pieces of material, which are to ultimately form the zones $105_1$-$105_Z$, may be placed in a mold such that, after molding, they form the arrangement of zones $105_1$-$105_Z$. As another example, in other embodiments, an injection molding process may be used in which amounts of different materials which are to ultimately form the zones $105_1$-$105_Z$, may be placed in a mold such that, after molding, they form the arrangement of zones $105_1$-$105_Z$.

Interconnection of the zones $105_1$-$105_Z$ of the drive/guide lug $48_i$ may be effected in various ways.

For instance, in some embodiments, adjacent ones of the zones $105_1$-$105_Z$ may be adhesively bonded using an adhesive between them. In some cases, these zones may be created by individually molding each of them prior to gluing them together. Alternatively, in some cases, and particularly if the zones are layered zones, the zones may be created by cutting or otherwise machining them out of a substrate prior to gluing them together. Any suitable adhesive may be used. For instance, in some cases, various commercially-available adhesives (e.g., Chemlok™ adhesives) may be used to adhesively bond adjacent different materials (e.g., rubber/metal using a Chemlok™253X adhesive, polyurethane/rubber using a Chemlok™ 213 adhesive, polyurethane/metal using a Chemlok™ 213 adhesive, etc.). In other cases, proprietary adhesives may be used.

In other embodiments, adjacent ones of the zones $105_1$-$105_Z$ may be chemically bonded to one another. That is, a chemical bond may be formed between these adjacent zones during manufacturing of the drive/guide lug $48_i$. The materials of these zones may thus be bonded to one another without any adhesive. Chemical bonding between materials implies an additional constraint to be considered when selecting the materials for the zones $105_1$-$105_Z$ of the drive/guide lug $48_i$, namely the intercompatibility of the materials. In particular, the materials used in adjacent zones must be capable of bonding to one another under the right conditions. The conditions must then be applied to ensure that bonding takes place. For example, in some embodiments, one type of rubber may chemically bond with another type of rubber, UHMW may chemically bond with rubber, TPO may chemically bond with rubber, etc.

There are several ways of creating the drive/guide lug $48_i$ with adjacent ones of the zones $105_1$-$105_Z$ that are chemically bonded. For instance, in some embodiments, a mold having removable portions corresponding to the various zones may be first filled with a first material, then have one or more removable portions removed, then subsequently filled (in the resulting cavities) with a second material, and so on until every zone is filled. In other embodiments, a first mold can be used to form a first zone $105_i$ of the drive/guide lug $48_i$, the resulting structure being removed from the mold and laced into another mold for forming a second zone $105_i$ of the drive/guide lug $48_i$ and so forth for every zone. In other embodiments, several different materials may be simultaneously injected into a given mold to form adjacent zones of the drive/guide lug $48_i$. In yet other embodiments, pieces of different materials, which will eventually make up respective ones of the zones $105_1$-$105_Z$ are prepared in advance, for instance by molding them or by cutting or otherwise machining them out of a substrate. The pieces are then arranged in their appropriate order and relative positions, and the overall arrangement may be consolidated, for instance by placing it in a heated mold until chemical bonding takes place. If rubber is used, different rubber pieces, such as strips for layered zones, may be vulcanized while together while arranged in their proper relative positions/order, such as to form the drive/guide lug $48_i$ having different zones that are chemically bonded together The pieces need not be all arranged and bonded together at once. For instance, if different temperatures are required to cause bonding between different zones, the process may first be applied to the zones having the highest bonding temperature prior and subsequently applied to zones having lower bonding temperatures.

The above-described examples of techniques may be combined together to form certain ones of the zones $105_1$-$105_Z$ of the drive/guide lug $48_i$ using one technique and other ones of these zones using another technique.

Instead of, or in addition to, being adhesively or chemically bonded together, in some embodiments, adjacent ones of the zones $105_1$-$105_Z$ of the drive/guide lug $48_i$ may be mechanically interlocked. That is, a zone $105_i$ and a zone $105_j$ adjacent to the zone $105_i$ may be in a mechanical interlock relationship in which they are interconnected via a given one of the zone $105_i$ and the zone $105_j$ extending into the other one of the zone $105_i$ and the zone $105_j$. More specifically, a first one of the zone $105_i$ and the zone $105_j$ comprises an interlocking space into which extends an interlocking portion of a second one of the zone $105_i$ and the zone $105_j$. The interlocking space may comprise one or more holes, one or more recesses, and/or one or more other hollow areas. This mechanical interlock relationship restrains movement of the zone $105_i$ and the zone $105_j$ relative to one another. Geometric details omitted from many of the embodiments discussed above may be included in the zones $105_1$-$105_Z$ to implement such a mechanical interlock relationship.

Figure 17A:
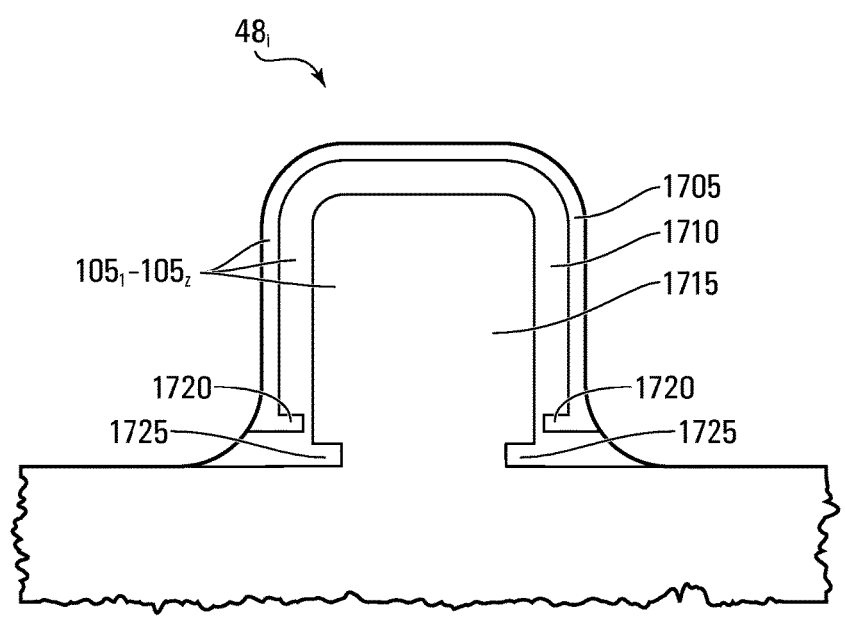
Figure 17B:
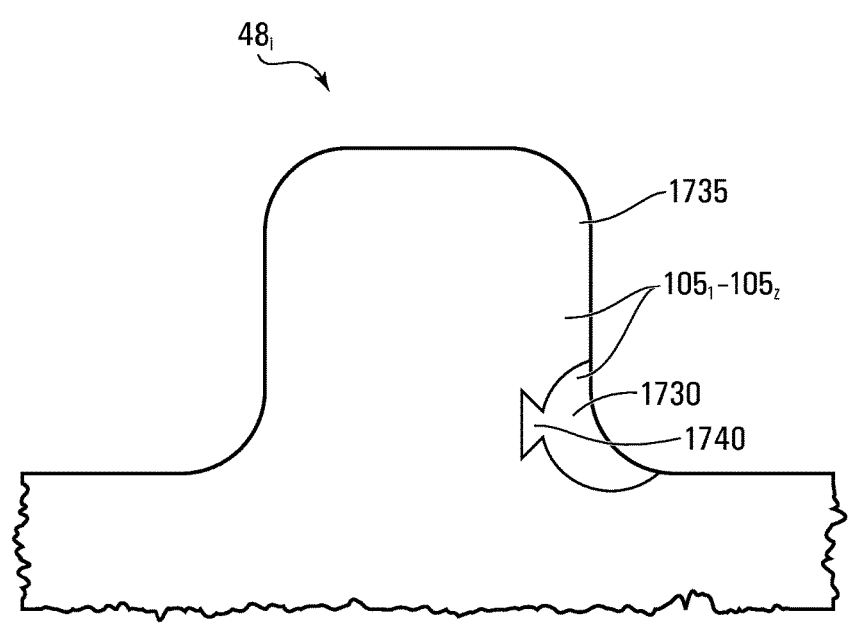

For example, FIG. 17A shows an embodiment in which the arrangement of zones $105_1$-$105_Z$ of the drive/guide lug $48_i$ comprise layered zones 1705, 1710 and core zone 1715, where each of the layered zones 1705, 1710 comprises an interlocking protuberance 1720, 1725 (e.g., a ridge) that fits into a corresponding interlocking groove in an adjacent zone. As another example, FIG. 17B shows an embodiment in which the arrangement of zones $105_1$-$105_Z$ of the drive/guide lug $48_i$ comprise a first zone 1730 and a second zone 1735, where the first zone 1730 includes a fishtail interlocking portion 1740 received within a corresponding interlocking cavity in the second zone 1735. Various other mechanical interlocking arrangements are possible in other embodiments.

Adjacent ones of the zones $105_1$-$105_Z$ of the drive/guide lug $48_i$ may be mechanically interlocked in various ways. For example, in some cases, adjacent ones of the zones $105_1$-$105_Z$ of the drive/guide lug $48_i$ may be mechanically interlocked by separately creating the different zones (e.g. by molding separately or cutting or otherwise machining out of a substrate) and then assembling them together such as by snap-fitting them together. In some cases, an adhesive may be applied prior to snap-fitting zones together. As another example, in some cases, adjacent ones of the zones $105_1$-$105_Z$ of the drive/guide lug $48_i$ may be mechanically interlocked by being overmolded. Using mechanical interlocking, it is not necessarily required for the zones to chemically bond. As such, overmolding may take place using incompatible materials, that is, materials not susceptible to form chemical bonds together during the overmodling process, or using temperatures or orders of molding not susceptible to cause chemical bonding between the zones. In some cases, it may be desired to have both chemical bonding and mechanical interlock for increased robustness. In such a case the manners of assembling the zones together may include the methods of forming chemical bonds described above.

While the above embodiments illustrate examples of making and interconnecting the zones $105_1$-$105_Z$ of the drive/guide lug $48_i$ to create the arrangement of zones $105_1$-$105_Z$ and the desired property variation profile, various other techniques may be used in other embodiments to provide the zones $105_1$-$105_Z$ of the drive/guide lug $48_i$. For instance, in some embodiments, a zone $105_i$ may be a coated zone provided by painting, depositing, spattering or spraying a coating over another zone $105_j$. The coating may be a coating of polyurethane, acrylic, or any other suitable material, and may have a thickness of about 1 to 1.5 mil (thousandth(s) of an inch) or any other suitable value.

Also, any suitable combination of the above techniques for creating the zones $105_1$-$105_Z$ of the drive/guide lug $48_i$ may be used. For example, in some embodiments, individual zones on the interior of the drive/guide lug $48_i$ may be overmolded (e.g., with chemical bonding and/or mechanical interlocking), while an outer protective layer (e.g., a skin or a cap) can be applied overtop the drive/guide lug $48_i$ and held thereon by adhesive bonding or by mechanical interlocking. Alternatively, a spray-on layer may be provided instead of or additionally to, the protective layer as an outermost layer.

ii. Continuous Gradient

In some embodiments, the property variation profile defined by the arrangement of zones $105_1$-$105_Z$ of the drive/guide lug $48_i$ may include a continuous gradient of modulus of elasticity. A continuous gradient of modulus of elasticity is a continuous variation of the modulus of elasticity in a specified direction across the arrangement of zones $105_1$-$105_Z$ of the drive/guide lug $48_i$. In such embodiments, adjacent ones of the zones $105_1$-$105_Z$ which define the continuous gradient of modulus of elasticity are infinitesimal zones. A zone is "infinitesimal" in that it is sufficiently small and has a sufficiently small difference in modulus of elasticity with an adjacent zone that its dimension along the specified direction of the continuous gradient is not macroscopically measurable.

Figure 18A:
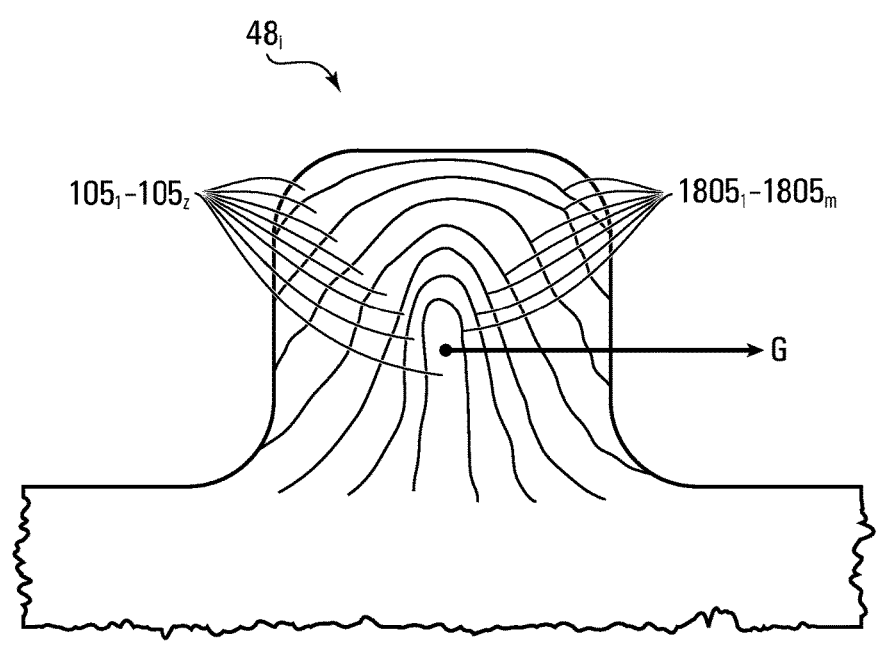
Figure 18B:
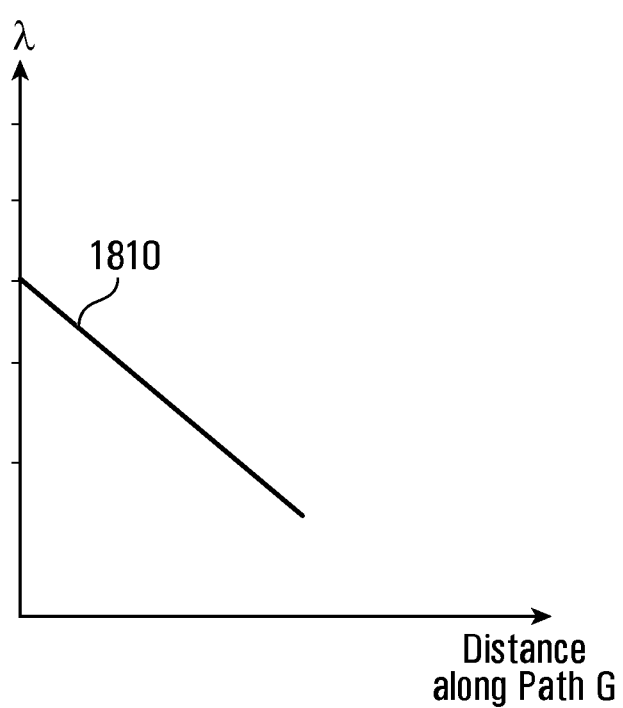

For example, FIG. 18A illustrates an example of an embodiment in which the variation of the modulus of elasticity across the arrangement of zones $105_1$-$105_Z$ of the drive/guide lug $48_i$ includes a continuous gradient of modulus of elasticity. In this embodiment, the continuous gradient extends throughout the drive/guide lug $48_i$. FIG. 18B illustrates a graph of the variation of the modulus of elasticity as a function of distance along line G shown in FIG. 18A. In this example, the spatial variation of the modulus of elasticity is a generally linear function 1810. Although the linear function 1810 is shown as perfectly straight, actual realizations of the continuous gradient of modulus of elasticity in some embodiments may not be perfect and imperfections may result in the variation not being perfectly linear.

In FIG. 18A, certain zones $1805_1$-$1805_M$ of the arrangement of zones $105_1$-$105_Z$ defining the continuous gradient of modulus of elasticity are represented. The zones $1805_1$-$1805_M$ are represented as isolines, where each isoline links points at which the value of the modulus of elasticity is the same. The space between adjacent zones $1805_1$, $1805_1$ includes other ones of the infinitesimal zones $105_1$-$105_Z$ defining the continuous gradient of modulus of elasticity.

A continuous gradient of modulus of elasticity may be configured in various other ways in other embodiments. For example, although in the above embodiment it is a linear function, the spatial variation of the modulus of elasticity defining the continuous gradient may be a more complex function (e.g., a polynomial function) in other embodiments. As another example, while in the above embodiment it extends throughout the entire drive/guide lug $48_i$, the continuous gradient of modulus of elasticity may only exist in a limited area of the drive/guide lug $48_i$ (e.g., less than half of its front-to-back or side-to-side dimension).

Individual ones of the infinitesimal zones $105_1$-$105_Z$ defining a continuous gradient of modulus of elasticity, such as those considered in the embodiments discussed above, may be provided in various ways.

For example, in some embodiments, the value of the modulus of elasticity may be related to a mixture of two or more constituents which make up material of the drive/guide lug $48_i$. For instance the relative concentration of each of the constituents may determine the modulus of elasticity of the resulting material. In such a case, any suitable fabrication method that permits gradual variation in the relative concentration of each of the constituents may be used to produce a continuous gradient of modulus of elasticity.

As an example, in some embodiments, a twin injection molding technique may be used whereby two ingredients are injected into a mold. The relative intensity of the two jets of ingredients may be varied as the mold fills. Alternatively, rather than to vary the intensity of jets injecting the ingredients into the mold, the two jets may be located at different locations of the mold, and the ingredients may be injected in liquefied form into the mold such that they mix between the two jets and form the drive/guide lug $48_i$ having a gradual change in relative concentration of the two ingredients varying for almost uniquely a first ingredient near a corresponding first jet location to almost uniquely a second ingredient near a corresponding second jet. As another example, in some embodiments, the drive/guide lug $48_i$ may be made by taking two or more solid pieces, each made of one of two ingredients, and placing them in relative position and heating them until they melt and mix at their interface.

While the above examples describe the use of two ingredients to achieve a continuous gradient of modulus of elasticity, it should be understood that three or more ingredients may be used as well, wherein the relative concentration of the three or more ingredients determines the value of a property such as the modulus of elasticity modulus. In some cases, not all ingredients need to be present throughout the drive/guide lug $48_i$, since one ingredient may have a concentration of 0% in some area. As such, in a three-or-more-ingredient scheme, there may be a variation of the relative concentration of two ingredients, followed by a variation of the relative concentration of two other ingredients (including, or not, a common ingredient with the first variation). Any other schemes for combining ingredients in varying relative concentration may be used to achieve a desired variation in a property such as modulus of elasticity.

As another example, in some embodiments, two or more zones of the arrangement of zones $105_1$-$105_Z$ may be formed by subjecting a common base material to a treatment causing at least two areas of the common base material to become different from one another, thus constituting two zones of different materials.

For instance, in some embodiments, a continuous gradient of modulus of elasticity may be achieved by a controlled heat treatment. For example, in some cases, an injection molding process may be used in which a rubber to make the drive/guide lug $48_i$ is injected into a mold at a high temperature and, as the molding process progresses, the temperature may be reduced to cause a smooth variation in the modulus of elasticity. Other heat treatments may be used in other cases.

As another example, in some embodiments, a continuous gradient of modulus of elasticity may be achieved by providing a drive/guide lug $48_i$ made of a single base material which is altered by applying a penetrating treatment such that the alteration induces a smooth change in the modulus of elasticity. For instance, in some cases, a material from which to make the drive/guide lug $48_i$ may be radiated with a certain penetrating (e.g. UV) radiation that causes a change in the material characteristics and that diminishes in intensity with depth. In other cases, an additive or impurity may be added to a material from which to make the drive/guide lug $48_i$ from the outside in. Thus, the additive or impurity may penetrate the material to a certain depth dropping in intensity as the depth is increased. This method can be combined with another penetrating treatment, such as heat application. For example, by applying sulfur (or a peroxide, or a urethane crosslinker, or a metal oxide), or another additive to the exterior of a material from which to make the drive/guide lug $48_i$ and applying heat thereto as well, the body may be made to have different levels of vulcanization at different depths, resulting in a variation of one or more properties with depth.

While a penetrating treatment may be applied to a single material, in some cases, multiple materials may be subjected to the penetrating treatment. For example, different materials having different sensitivity to the penetrating treatment may be provided at different depths to modify the effective area over which the penetrating treatment is effective and/or to alter the effect of the penetrating treatment. Alternatively or additionally, materials having a different reaction to the penetrating treatment may be placed in different locations within the drive/guide lug $48_i$ so as to provide areas characterized by different gradients of a same or a different property.

As another example, in some embodiments, a continuous gradient of modulus of elasticity may be achieved by providing a large number of thin layers each of which differs from its neighbors by a small change in modulus of elasticity. This may result in a step function with a very fine granularity resembling a smooth function. By heating the thin layers, certain effects may take place at the layers' interfaces which may cause a smoothing of the step function. For instance, in some cases, when heated to a certain temperature (e.g., at or near a melting point of a material making up a layer), adjacent layers may intermix at their interface which may cause a smoothing of the step function of property variation, material from one layer may diffuse into that of another layer, and/or material from one layer may from cross-links with that of another layer.

iii. Discrete Gradient and Continuous Gradient

In some embodiments, the property variation profile defined by arrangement of zones $105_1$-$105_Z$ of the drive/guide lug $48_i$ may include at least one discrete gradient of modulus of elasticity and at least one continuous gradient of modulus of elasticity. Certain ones of the zones $105_1$-$105_Z$ of the drive/guide lug $48_i$ may be discrete zones that define a discrete gradient, while other ones of the zones $105_1$-$105_Z$ may be infinitesimal zones $105_1$-$105_Z$ that define a continuous gradient.

Figure 19:
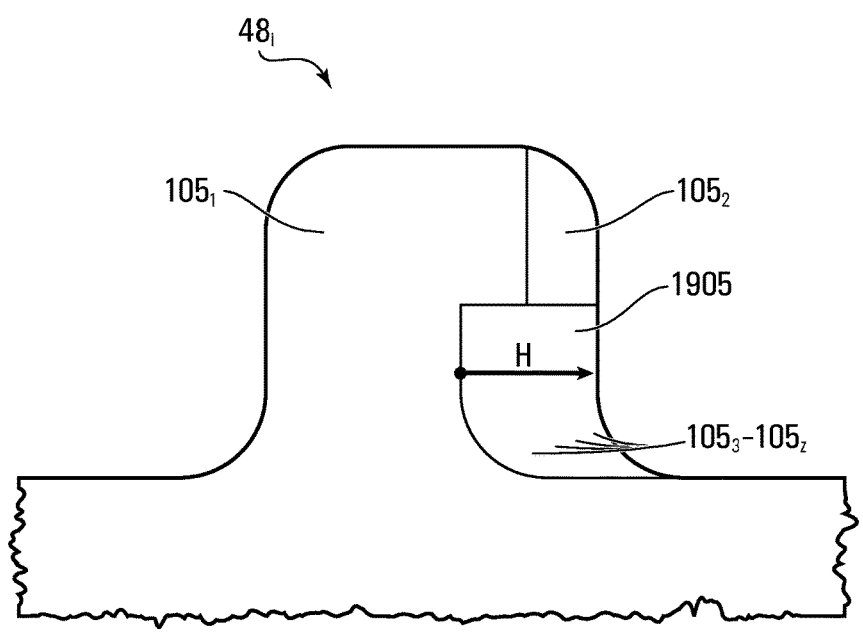

For instance, FIG. 19 illustrates an example of such an embodiment, which is similar to the example of FIG. 14, but with the area 1410 which comprises three discrete zones 1411, 1412, 1413 in the example of FIG. 14 replaced by an area 1905 comprising infinitesimal zones defining a continuous gradient of modulus of elasticity wherein the modulus of elasticity decreases along line H.

Various other combinations of discrete gradients and continuous gradients are possible in other embodiments (e.g., an outer spray-on or sheet layer with a continuous gradient in a remainder of the drive/guide lug $48_i$).

iv. Property Variation Characterization

The property variation profile defined by arrangement of zones $105_1$-$105_Z$ of a drive/guide lug $48_i$ may be characterized in various ways.

For example, a ratio $\lambda_i/\lambda_j$ of the modulus of elasticity $\lambda_i$ of a zone $105_i$ and the modulus of elasticity $\lambda_j$ of a zone $105_j$ adjacent to the zone $105_1$, where $\Delta_j > \Delta_i$ such that $0 < \lambda_i/\lambda_j < 1$, may take on various values. For instance, in some embodiments, the ratio $\lambda_i/\lambda_j$ may be at least 0.2, in some cases at least 0.3, in some cases at least 0.4, in some cases at least 0.5, in some cases at least 0.6, in some cases at least 0.7, in some cases at least 0.8, in some cases at least 0.9, and even more in some cases (e.g., 0.95 or more). Values of the ratio $\lambda_i/\lambda_j$ closer to one, such as for instance between 0.6 and 1 or particularly between 0.7 and 1, may be desired in some cases. This may avoid too great of a difference in modulus of elasticity between the adjacent zones $105_i$, $105_j$ which could create a stress concentration at the interface between these zones, which could lead to cracking or tearing at the interface between these zones.

As another example, a ratio $\lambda_{min}/\lambda_{max}$ of the minimum modulus of elasticity $\lambda_{min}$ of the drive/guide lug $48_i$ and the maximum modulus of elasticity $\lambda_{max}$ of the drive/guide lug $48_i$ may take on various values. For instance, in some embodiments, the ratio $\lambda_{min}/\lambda_{max}$ may be at least 0.2, in some cases at least 0.3, in some cases at least 0.4, in some cases at least 0.5, in some cases at least 0.6, in some cases at least 0.7, in some cases at least 0.8, in some cases at least 0.9, and even more in some cases (e.g., 0.95 or more).

As another example, a gradient of the modulus of elasticity of the drive/guide lug $48_i$ has a spatial rate of change $\Delta\lambda/D = (\lambda_{high} - \lambda_{low})/D$, where $\Delta\lambda = (\lambda_{high} - \lambda_{low})$ is an increase in the modulus of elasticity between a point $P_{low}$ with the modulus of elasticity $\lambda_{low}$ and a point $P_{high}$ with the modulus of elasticity $\lambda_{high}$, which may take on various values. In embodiments in which individual ones of the zones $105_1$-$105_Z$ that define the gradient are discrete such that the gradient is a discrete gradient, the spatial rate of change $\Delta\lambda/D$ can be evaluated by taking the points $P_{low}$ and $P_{high}$ as midpoints of those zones which respectively have the moduli of elasticity how and $\lambda_{high}$. For instance, in some embodiments, the spatial rate of change $\Delta\lambda/D$ may be no more 5 MPa/mm, in some cases no more than 4 MPa/mm, in some cases no more than 3 MPa/mm, in some cases no more than 2 MPa/mm, and in some cases no more than 1 MPa/mm. This may avoid too great of a difference in modulus of elasticity between the zones which could create a stress concentration at the interface between these zones, which could lead to cracking or tearing at the interface between these zones.

As another example, in some embodiments, a size of one or more of the zones $105_1$-$105_Z$ of the drive/guide lug $48_i$ may be considered. For instance, in some cases, a first one of the zones $105_1$-$105_Z$ that is more inward than a second one of the zones $105_1$-$105_Z$ may be thicker than the second one of the zones $105_1$-$105_Z$. For instance, an example of such an embodiment is shown in FIGS. 10A and 10B where the each of the inner zone 120 and the core zone 125 is thicker than the outer zone 110 or the mid zone 115. In some examples, an innermost one of the zones $105_1$-$105_Z$ may be a thickest one of the zones $105_1$-$105_Z$.

As yet another example, in some embodiments, a size and elasticity of one or more of the zones $105_1$-$105_Z$ of the drive/guide lug $48_i$ may be considered together. For instance, in some cases, a first one of the zones $105_1$-$105_Z$ that is thicker than a second one of the zones $105_1$-$105_Z$ may be stiffer than the second one of the zones $105_1$-$105_Z$. For instance, an example of such an embodiment is shown in FIGS. 10A and 10B where the core zone 125 is thicker and stiffer than the outer zone 110. In some examples, a thickest one of the zones $105_1$-$105_Z$ may be a stiffer one of the zones $105_1$-$105_Z$.

Although in embodiments discussed above the property variation profile defined by the arrangement of zones $105_1$-$105_Z$ includes a variation of the modulus of elasticity across the drive/guide lug $48_i$, in other embodiments, the property variation profile may include a variation of one or more other material properties in addition to or instead of a variation of the modulus of elasticity.

For example, in some embodiments, the property variation profile may include a variation of a tensile strength across the arrangement of zones $105_1$-$105_Z$. For instance, in some cases, the variation of the tensile strength may include an increase of the tensile strength inwardly such that a zone $105_i$ is more inward and has a greater tensile strength than a zone $105_j$ (e.g., the zone $105_j$ may be an outermost elastomeric zone and the zone $105_i$ may be an underlying elastomeric zone). In other cases, the variation of the tensile strength may include an increase of the tensile strength outwardly such that a zone $105_j$ is more outward and has a greater tensile strength than a zone $105_i$ (e.g., the zone $105_j$ may be an outermost elastomeric zone and the zone $105_i$ may be an underlying elastomeric zone).

As another example, in some embodiments, the property variation profile may include a variation of a crack propagation resistance across the arrangement of zones $105_1$-$105_Z$. The crack propagation resistance of a zone $105_x$, which can also be referred to a crack growth resistance, refers to a resistance of material making up the zone $105_x$ to crack propagation. For example, the crack propagation resistance of the zone $105_x$ can be evaluated on a basis of a crack growth rate (e.g., in mm per number of cycles) measured using a suitable crack growth test (e.g., a pure-shear crack growth test) on the material making up the zone $105_x$, such that the crack propagation resistance is inversely related to the crack growth rate (i.e., the lower the crack growth rate, the higher the crack propagation resistance). For instance, in some cases, the variation of the crack propagation resistance may include an increase of the crack propagation resistance outwardly such that a zone $105_j$ is more outward and has a greater crack propagation resistance (i.e., a lower crack growth rate) than a zone $105_i$ (e.g., the zone $105_j$ may be an outermost elastomeric zone and the zone $105_i$ may be an underlying elastomeric zone). In other cases, the variation of the crack propagation resistance may include an increase of the crack propagation resistance inwardly such that a zone $105_i$ is more inward and has a greater crack propagation resistance (i.e., a lower crack growth rate) than a zone $105_j$ (e.g., the zone $105_i$ may be an outermost elastomeric zone and the zone $105_j$ may be an underlying elastomeric zone).

Principles discussed above in respect of the variation of modulus of elasticity may therefore also apply to a variation of another material property. For instance, the examples of property variation characterization discussed above in respect of the modulus of elasticity λ can be expressed in terms of any desired material property P.

b) Zone with Dedicated Function

In some embodiments, one or more of the zones $105_1$-$105_Z$ of the drive/guide lug $48_i$ may be provided to implement a dedicated function. Examples of such dedicated functions are discussed below.

i. Wear Indicator Zone

In some embodiments, one or more zones of the arrangement of zones $105_1$-$105_Z$ of a drive/guide lug $48_i$ may implement a wear indicator to indicate a level of wear of the drive/guide lug $48_i$.

Figure 16:
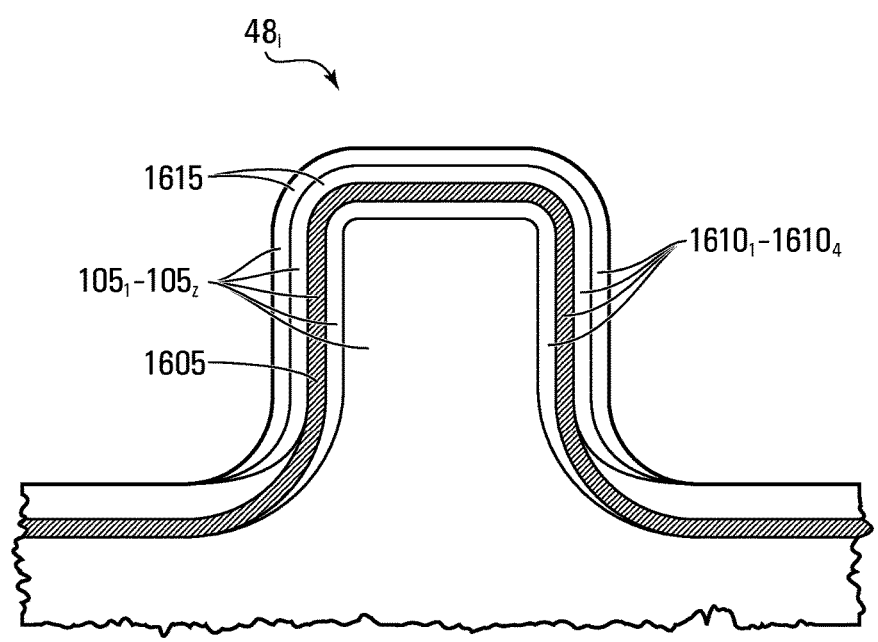

FIG. 16 illustrates an example in which the arrangement of zones $105_1$-$105_Z$ includes several layered zones $1610_1$-$1610_4$ characterized by a variation in modulus of elasticity which may be varied similarly to what was described in the example of FIG. 11A. In this example, the drive/guide lug $48_i$ also includes a colored zone 1605, which besides being characterized by having a particular modulus of elasticity, is also characterized by having a distinctive color. The layer 1605 having a distinctive color may be useful in allowing visual determination of a level of wear of the drive/guide lug $48_i$. When through prolonged use, the outer layers $1615_1$, $1615_2$ wear out, at least in some areas, the colored zone 1605 becomes exposed making it possible to see, from the color, that the wear of the drive/guide lug $48_i$ has reached the level of colored zone 1605. This may be useful as an indicator that it is time to service or replace the drive/guide lug $48_i$ or the track 22 altogether. Exposure of the colored zone 1605 may also indicate that the drive/guide lug $48_i$ has shed its two outermost layers $1615_1$, $1615_2$ and now has a modulus of elasticity on its exterior that is outside of an operationally acceptable range for the track 22.

In other embodiments, the colored zone 1605 may be characterized by its color only and not its modulus of elasticity. Also, in other embodiments, a colored zone such as the colored zone 1605 may extend into the carcass 36 of the track 22 (e.g., in the rolling path 33) such as to provide visual indication of wear in the carcass 36 of the track 22 as well.

Figure 20:
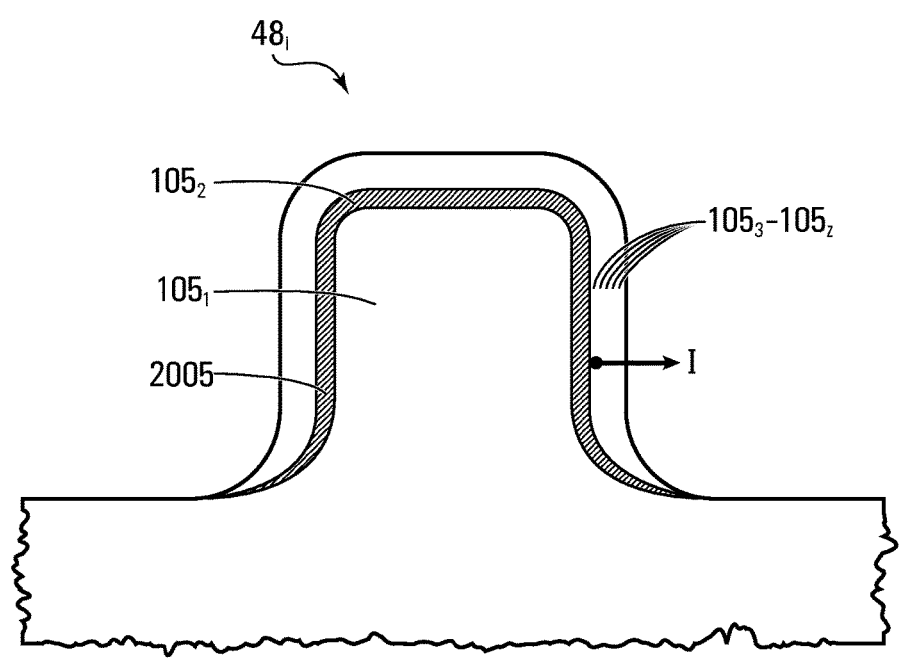

FIG. 20 illustrates another example of an embodiment in which a zone implements a wear indicator. In this embodiment, the arrangement of zones $105_1$-$105_Z$ of the drive/guide lug $48_i$ comprises infinitesimal zones that define a continuous gradient of modulus of elasticity along line I, in a manner similar to that discussed above in respect of FIG. 18A. In this example, the drive/guide lug $48_i$ also comprises a zone 2005 characterized by having a certain color that serves as a wear marker.

A wear indicator zone may be configured in various other ways in other embodiments.

ii. Sacrificial Zone

In some embodiments, a zone $105_i$ of the drive/guide lug $48_i$ may be a sacrificial zone that is intended to be sacrificed during use of the endless track 22. For instance, the sacrificial zone may be intended to protect the lug during a break-in period. The sacrificial zone may disappear by wearing out through abrasion, by undergoing a phase transition (e.g., liquefaction, evaporation or sublimation) due to temperature and/or pressure, and/or by experiencing any other process occurring during use of the track 22. For example, in some cases, the sacrificial zone may be a protective layer or coating at the outermost part of the drive/guide lug $48_i$ that is provided to the drive/guide lug $48_i$ (e.g. by molding, adhesive bonding, mechanical interlocking, painting-on, spraying-on, etc.) that is intended to wear off in a certain amount of time and/or when reaching a certain temperature. Various soft materials may be used for the protective layer or coating (e.g., wax, silicone, PTFE-based, etc.). For instance, in some embodiments, the sacrificial zone may be a PTFE-based coating or other low-friction coating that wears off with time.

iii. State-Changing Zone

In some embodiments, a zone $105_i$ of the drive/guide lug $48_i$ may be a state-changing zone that undergoes a change in state during use of the track 22. For example, a particular material may harden with time, while another may undergo a permanent change in modulus of elasticity when a certain temperature is reached, etc. For instance, in some cases, such changes may be planned and anticipated as part of a break-in period of the endless track 22. The material distribution profile of the drive/guide lug $48_i$ may be designed in such a manner as to yield a desired property variation profile after the break-in period, but may have less-than-ideal properties before and during the break-in period. In other cases, the changes may be planned for when the track 22 is used after its break-in period.

Although various examples of a drive/guide lug $48_i$ with a material distribution profile have been considered above, a drive/guide lug $48_i$ may have various other material distribution profiles in other embodiments.

2. Drive/Guide Lug with a Particular Shape

In some embodiments, a drive/guide lug $48_i$ may have a particular shape to enhance its wear resistance or otherwise enhance its performance.

a) Drive Lug with Uneven Drive Surface

Figure 21:
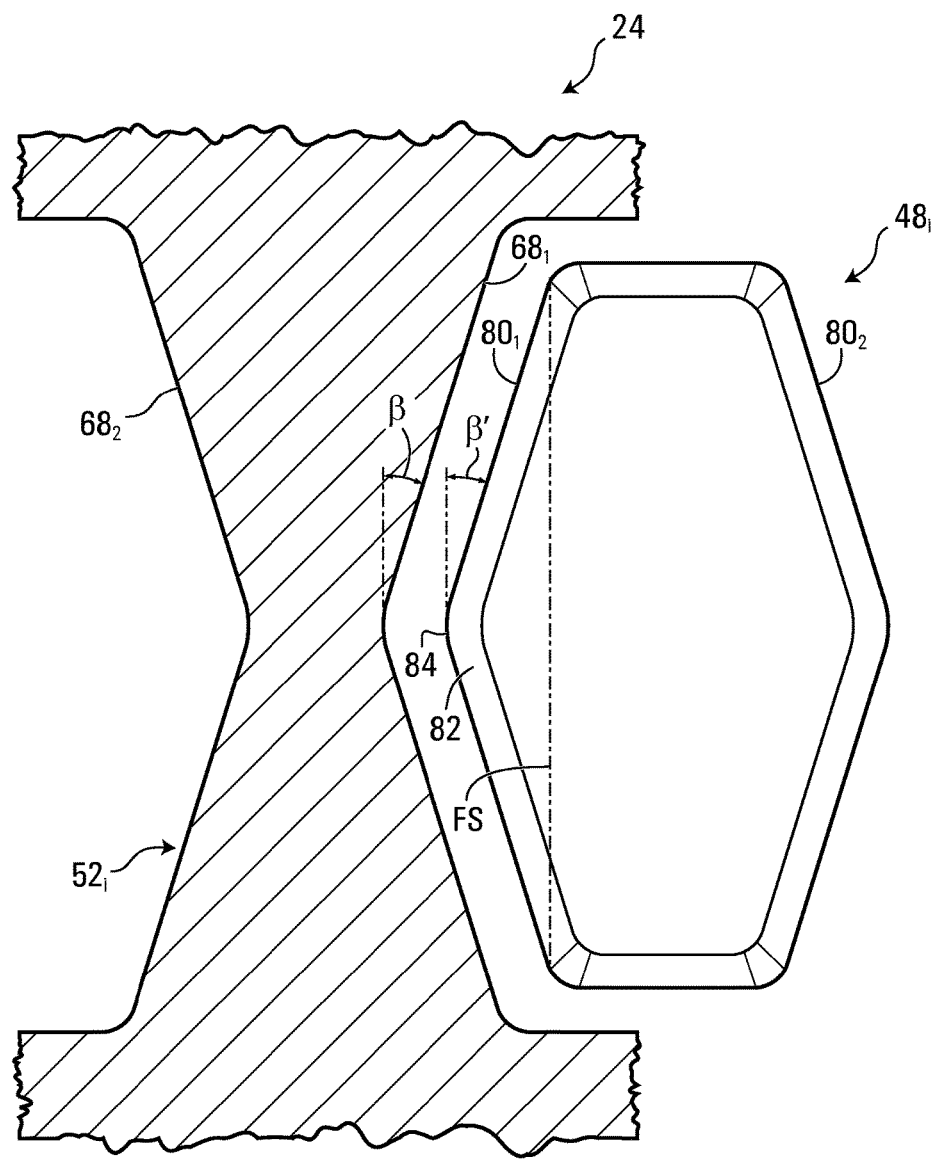
FIGS. 21 and 22 show different examples of an uneven drive surface of a drive lug of the endless track facing a drive member of the drive wheel.

In some embodiments in which the drive wheel 24 is a sprocket, as shown in FIG. 21, the drive surface $80_1$ of a drive/guide lug $48_i$ may be uneven (i.e., non-flat) such that an uneven portion 82 of the drive/guide lug $48_i$ contacts a drive member $52_i$ of the sprocket 24 when the drive/guide lug $48_i$ engages the drive member $52_i$. For example, in this embodiment, the drive surface $80_1$ of the drive/guide lug $48_i$ may be in generally conformity with a drive surface $68_1$ of the drive member $52_i$ of the sprocket 24. This increases a contact area of the drive/guide lug $48_i$ which contacts the drive member $52_i$ of the sprocket 24 in order to enhance load distribution on the drive/guide lug $48_i$ and on the drive member $52_i$ of the sprocket 24. The contact area of the drive/guide lug $48_i$ is increased in that it is greater than if the drive surface $80_1$ of the drive/guide lug $48_i$ was substantially flat but the drive/guide lug $48_i$ was otherwise identical. By distributing the load over a greater contact area, stress on the drive/guide lug $48_i$ is reduced.

In this embodiment, the uneven portion 82 of the drive/guide lug $48_i$ is a protrusion extending towards the drive member $52_i$ of the sprocket 24 when the drive/guide lug $48_i$ engages the drive member $52_i$. The protrusion 82 protrudes towards the drive member $52_i$ of the sprocket 24 beyond an imaginary flat plane FS extending where the drive surface $80_1$ of the drive/guide lug $48_i$ would be if it was flat. The drive surface $80_1$ of the drive/guide lug $48_i$ is uneven in the widthwise direction of the endless track 22 to form the protrusion 82. The drive/guide lug $48_i$ thus tapers in the widthwise direction of the track 22.

Also, in this embodiment, the drive surface $68_1$ of the drive member $52_i$ of the sprocket 24 is uneven and forms a recess 83 of the drive member $52_i$. The protrusion 82 of the drive/guide lug $48_i$ extends into the recess 83 of the drive member $52_i$ when the drive/guide lug $48_i$ engages the drive member $52_i$. In some cases, the protrusion 82 of the drive/guide lug $48_i$ may extend into the recess 83 of the drive member $52_i$ such that an apex 84 of the protrusion 82 contacts the drive member $52_i$. In other cases, the protrusion 82 of the drive/guide lug $48_i$ may extend into the recess 83 of the drive member $52_i$ such that the apex 84 of the protrusion 82 does not contact the drive member $52_i$.

More particularly, in this embodiment, the drive surface $80_1$ of the drive/guide lug $48_i$ is angled in that it defines an oblique angle β' relative to the widthwise direction of the endless track 22. For instance, in some embodiments, the angle β' may be at least 0.25°, in some cases at least 0.5°, in some cases at least 0.75°, in some cases at least 1°, in some cases at least 1.25°, in some cases at least 1.5°, in some cases at least 1.75°, in some cases at least 2°, in some cases at least 3°, in some cases at least 5°, and in some cases even more (e.g., at least 10° or 15°). The angle β' may take on any other suitable value in other embodiments.

Also, in this embodiment, the drive surface $68_1$ of the drive member $52_i$ of the sprocket 24 is angled in that it defines an oblique angle β relative to a direction parallel to an axis of rotation of the sprocket 24. In this case, the angle β is a draft angle used during manufacturing of the sprocket 24 to facilitate a casting process used to make the sprocket 24. For instance, in some embodiments, the angle β may be at least 0.25°, in some cases at least 0.5°, in some cases at least 0.75°, in some cases at least 1°, in some cases at least 1.25°, in some cases at least 1.5°, in some cases at least 1.75°, in some cases at least 2°, or even more in some cases. The angle β' defined by the drive surface $80_1$ of the drive/guide lug $48_i$ is thus selected to accommodate the angle β defined by the drive surface $68_1$ of the drive member $52_i$. For instance, in some embodiments, a ratio β'/β of the angle β' of the drive surface $80_1$ of the drive/guide lug $48_i$ and the angle β of the drive surface $68_1$ of the drive member $52_i$ may be between 0.5 and 1.5, in some cases between 0.7 and 1.4, in some cases between 0.8 and 1.2, in some cases between 0.9 and 1.1, and in some cases 1.0.

The drive surface $80_1$ of the drive/guide lug $48_i$ and the drive surface $68_1$ of the drive member $52_i$ may have various other uneven forms that are in general conformity with one another in other embodiments. For example, in some embodiments, instead of just one oblique angle as in the embodiment considered above, each of the drive surface $80_1$ of the drive/guide lug $48_i$ and the drive surface $68_1$ of the drive member $52_i$ may have two (2) or more similar oblique angles. As another example, in some embodiments, instead of or in addition to being angled, each of the drive surface $80_1$ of the drive/guide lug $48_i$ and the drive surface $68_1$ of the drive member $52_i$ may be curved in such a way that their respective curvatures are in generally conformity to one another.

Figure 22:
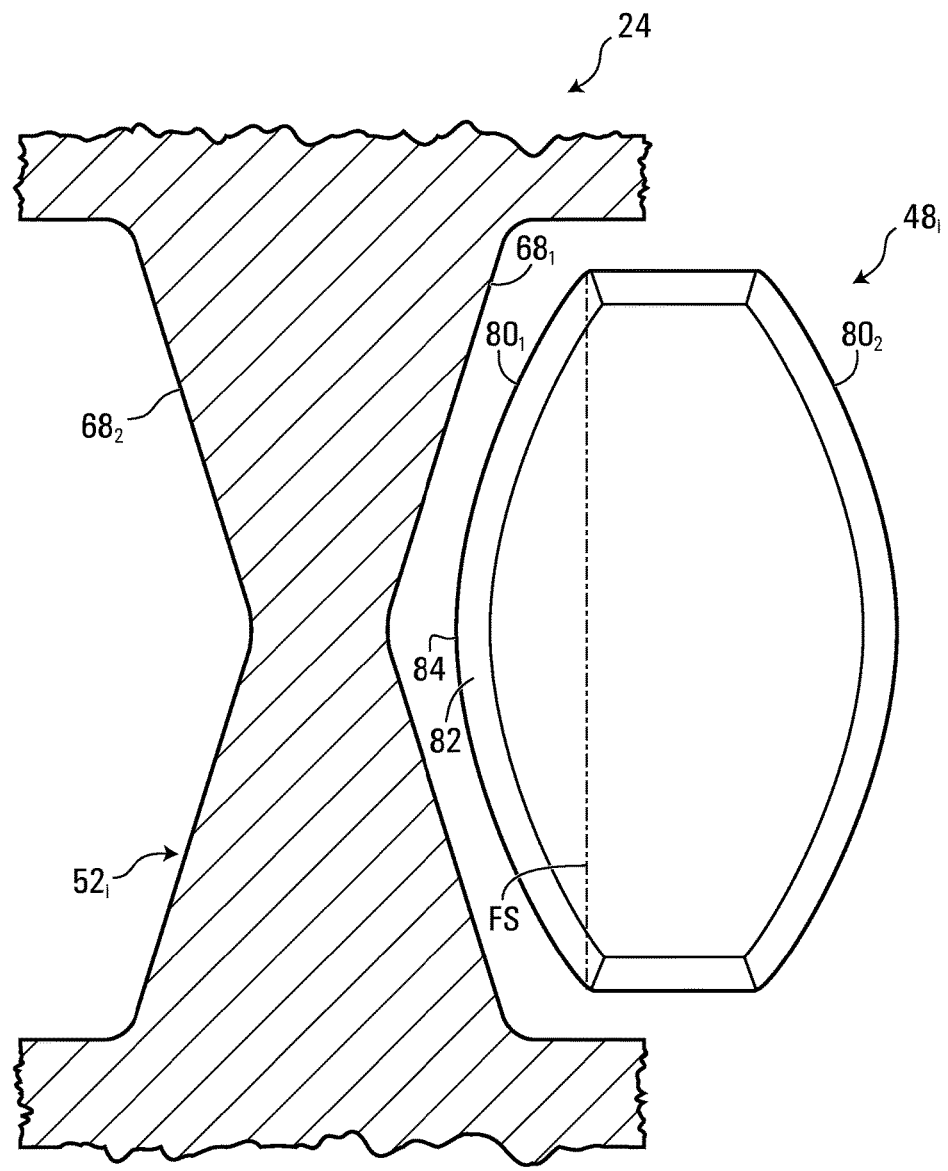

The drive surface $80_1$ of the drive/guide lug $48_i$ and thus the uneven portion 82 of the drive/guide lug $48_i$ may have various other uneven forms in other embodiments. For example, instead of being a protrusion, in other embodiments, the uneven portion 82 of the drive/guide lug $48_i$ may be a recess facing the drive member $52_i$ of the sprocket 24 when the drive/guide lug $48_i$ engages the drive member $52_i$. As another example, in other embodiments, instead of or in addition to being angled, the drive surface $80_1$ of the drive/guide lug $48_i$ and thus the uneven portion 82 of the drive/guide lug $48_i$ may be curved (e.g., convexly and/or concavely curved). FIG. 22 shows an example of an embodiment in which the drive surface $80_1$ of the drive/guide lug $48_i$ and thus the uneven portion 82 of the drive/guide lug $48_i$ are curved.

In this embodiment, a description similar to that presented above in respect of the drive surface $80_1$ of the drive/guide lug $48_i$ and the drive surface $68_1$ of the drive member $52_i$ applies to the drive surface $80_2$ of the drive/guide lug $48_i$ and a drive surface $68_2$ of the drive member $52_i$ of the sprocket 24. In other embodiments, only one of the drive surfaces $80_1$, $80_2$ of the drive/guide lug $48_i$ may be uneven as described above while the other one may be substantially flat.

Although in this embodiment the uneven portion 82 of the drive/guide lug $48_i$ is an integral portion of the drive/guide lug $48_i$ (e.g., molded elastomeric material of the drive/guide lug $48_i$), in other embodiments, the uneven portion 82 of the drive/guide lug $48_i$ may be formed by a removable member of the drive/guide lug $48_i$ that is mounted to a core of the drive/guide lug $48_i$ and that has an uneven outer surface providing the uneven drive surface $80_1$ of the drive/guide lug $48_i$. For example, in some embodiments, the removable member may comprise a cap that is mounted to the core of the drive/guide lug $48_i$. The core of the drive/guide lug $48_i$ may have a generally flat surface facing towards the drive member $52_i$ of the sprocket 24 when the drive/guide lug $48_i$ engages the drive member $52_i$. The removable member may have a generally flat inner surface facing the generally flat surface of the core of the drive/guide lug $48_i$, while the removable member's uneven outer surface provides the uneven drive surface $80_1$ of the drive/guide lug $48_i$. For instance, in such embodiments, what is shown in FIGS. 21 and 22 would be the removable member, with the core of the drive/guide lug $48_i$ being located underneath the removable member.

While in this embodiment the drive surface $68_1$ of the drive member $52_i$ of the sprocket 24 is uneven, in other embodiments, the drive/guide lug $48_i$ with its uneven portion 82 may be used in cases where the drive surface $68_1$ of the drive member $52_i$ is substantially flat.

b) Drive/Guide Lug Avoiding Interference with Mid-Roller Support

Figure 23:
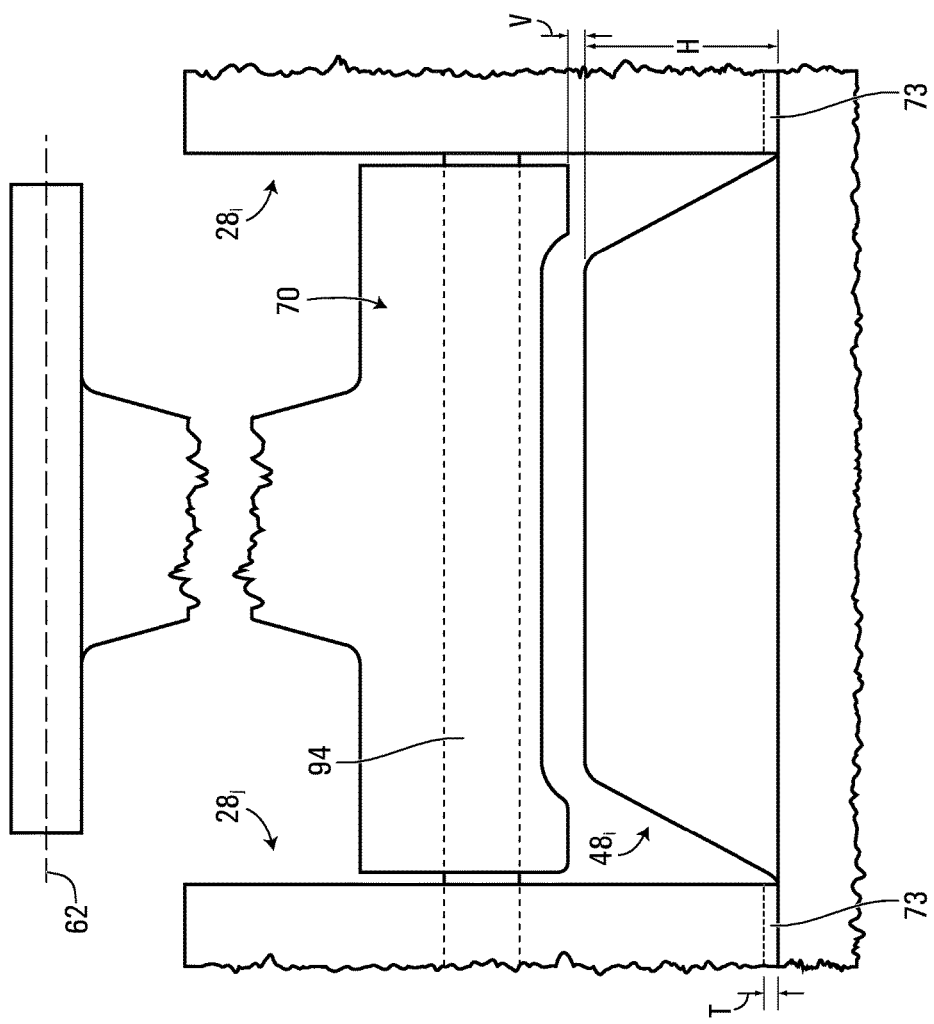
FIG. 23 shows an example of an inner lug of the endless track designed to avoid interference with a roller wheel support of the track assembly.

In some embodiments in which a drive/guide lug $48_i$ is used to guide the endless track 22 by passing between laterally adjacent ones of the mid-rollers $28_1$-$28_6$, the drive/guide lug $48_i$ may be configured to reduce a potential for interference with a mid-roller support 70 which carries one or more of the mid-rollers $28_1$-$28_6$, includes the axle 94 of each of these one or more carried mid-rollers, and is located above the drive/guide lug $48_i$, as shown in FIG. 23. In this example, the mid-roller support 70 includes the axle 94 which is a common axle of the mid-rollers $28_i$, $28_j$. Also, in this example, the mid-roller support 70 is pivotable relative to the frame 13 of the track assembly $16_i$ about a pivot axis 62 (e.g., such as a pivot axis $71_1$ or $71_2$ shown in FIG. 1) to allow the mid-rollers $28_i$, $28_j$ to move up and down relative to the frame 13 of the track assembly $16_i$. The mid-roller support 70 may be configured in various other ways in other examples. For instance, in other examples, a mid-roller carried by the mid-roller support 70 may have its own dedicated axle 94 and/or the mid-roller support 70 may not be pivotable relative to the frame 13 of the track assembly $16_i$.

Certain factors can be taken into account to reduce the potential for interference between the drive/guide lug $48_i$ and the mid-roller support 70. For example, in some cases:

The mid-rollers $28_i$, $28_j$ may reduce in diameter as they wear out. For instance, in some embodiments, each of the mid-rollers $28_i$, $28_j$ may comprise a rubber or other elastomeric covering 73 on its circumference to enhance friction with the rolling path 33 of the inner side 45 of the endless track 22.

Such a covering 73 is represented in dotted line in FIG. 23. As this rubber or other elastomeric covering 73 wears off during use, the diameter of each of the mid-rollers $28_i$, $28_j$ is reduced, bringing the mid-roller support 70 down closer to the drive/guide lug $48_i$. In other embodiments, no such covering 73 may be provided but the mid-rollers $28_i$, $28_j$ may nevertheless reduce in diameter as they material wears off.

The tread pattern 40 and its traction lugs $58_1$-$58_T$ may wear unevenly in the widthwise direction of the endless track 22 such that the tread pattern 40 is thinner in one half of the width of the endless track 22. This causes the drive/guide lug $48_i$ to be inclined relative to the horizontal and thus the mid-roller support 70 to be closer to a top corner region of the drive/guide lug $48_i$.

The endless track 22 may be misaligned in the widthwise direction of the track assembly $16_i$.

The tension in the endless track 22 may be low (e.g, causing deformation or deflection in the center of the track 22).

The drive/guide lug $48_i$ may be configured such that, when the endless track 22 is new and the mid-rollers $28_i$, $28_j$ are new, a vertical clearance V between the drive/guide lug $48_i$ and the mid-roller support 70 is sufficient to avoid interference between the drive/guide lug $48_i$ and the mid-roller support 70 as the track assembly $16_i$ is used. The vertical clearance V may take one various values in various embodiments. For example, in some embodiments, the vertical clearance V may be at least 6 mm (e.g., in cases where no covering 73 is provided on the mid-rollers $28_i$, $28_j$), in some cases at least 9 mm, in some cases at least 12 mm, in some cases at least 15 mm, in some cases at least 18 mm, in some cases at least 21 mm, or even more in some cases.

As shown in FIG. 23, in some embodiments, the drive/guide lug $48_i$ may be shaped to provide for the vertical clearance V and thus reduce the potential for interference with the mid-roller support 70.

For example, in some cases, the drive/guide lug $48_i$ may be shaped such that, when the diameter of each of the mid-rollers $28_1$-$28_6$ has reduced to its minimum during normal use, the drive/guide lug $48_i$ clears the mid-roller support 70 without interference. For instance, in embodiments in which each of the mid-rollers $28_i$, $28_j$ comprises a rubber or other elastomeric covering 73 on its circumference, a height H of the drive/guide lug $48_i$ may be sufficiently small that, when the covering 73 has worn off, i.e., the diameter of each of the mid-rollers $28_1$-$28_6$ has reduced by an amount corresponding to an original thickness T of the covering 73, the drive/guide lug $48_i$ clears the mid-roller support 70 without interference.

Embodiments discussed above thus provide solutions to enhance the wear resistance and/or otherwise enhance the performance of the drive/guide lugs $48_1$-$48_N$ of the endless track 22. While these solutions were discussed separately, in some embodiments, any feature of any embodiment described herein may be used in combination with any feature of any other embodiment described herein.

Although potentially less severe than wear or other deterioration of the drive/guide lugs $48_1$-$48_N$ of the endless track 22, in some cases, wear or other deterioration of the traction lugs $58_1$-$58_T$ (e.g., due to particularly abrasive ground material) can sometimes become significant enough to adversely affect performance or appearance of the endless track 22. Thus, in some embodiments, solutions described above in respect of the drive/guide lugs $48_1$-$48_N$ may be similarly applied to the traction lugs $58_1$-$58_T$.

Each track assembly $16_i$ of the agricultural vehicle 10, including its endless track 22, may be configured in various other ways in other embodiments.

For example, each track assembly $16_i$ may comprise different and/or additional components in other embodiments. For example, in some embodiments, the track assembly $16_i$ may comprise a front drive wheel (e.g., the idler wheel 26 may be replaced by a drive wheel) instead of or in addition to the drive wheel 24. As another example, in some embodiments, the track assembly $16_i$ may comprise more or less roller wheels such as the roller wheels $28_1$-$28_6$. As yet another example, rather than have a generally linear configuration as in this embodiment, in other embodiments, the track assembly $16_i$ may have various other configurations (e.g., a generally triangular configuration with the axis of rotation of the drive wheel 24 located between the axes of rotations of leading and trailing idler wheels).

While in the embodiment considered above the off-road vehicle 10 is an agricultural vehicle, in other embodiments, the vehicle 10 may be an industrial vehicle such as a construction vehicle (e.g., a loader, a bulldozer, an excavator, etc.) for performing construction work or a forestry vehicle (e.g., a feller-buncher, a tree chipper, a knuckleboom loader, etc.) for performing forestry work, or a military vehicle (e.g., a combat engineering vehicle (CEV), etc.) for performing military work, or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track being mountable around a plurality of wheels for driving and guiding the track around the wheels, the track being elastomeric to flex as the track moves around the wheels, the track comprising:
   an inner surface for facing the wheels;
   a ground-engaging outer surface for engaging the ground; and
   a plurality of drive/guide lugs projecting from the inner surface, each drive/guide lug comprising:
      a plurality of elastomeric layers that includes a plurality of elastomeric materials different from one another; and
      a non-elastomeric layer entirely contained within the drive/guide lug, spaced from a periphery of the drive/guide lug, and disposed over and astride a given one of the elastomeric layers that is beneath the non-elastomeric layer.

2. The track of claim 1, wherein the non-elastomeric layer is a polymeric layer.

3. The track of claim 1, wherein a modulus of elasticity of a non-elastomeric material of the non-elastomeric layer is greater than a modulus of elasticity of a given one of the elastomeric materials.

4. The track of claim 1, wherein the non-elastomeric layer reduces a potential for crack propagation in the drive/guide lug.

5. The track of claim 1, wherein the elastomeric materials comprise at least three elastomeric materials different from one another.

6. The track of claim 1, wherein a modulus of elasticity of a first one of the elastomeric materials is different from a modulus of elasticity of a second one of the elastomeric materials.

7. The track of claim 6, wherein: the second one of the elastomeric materials is disposed inwardly relative to the first one of the elastomeric materials; and the modulus of elasticity of the second one of the elastomeric materials is greater than the modulus of elasticity of the first one of the elastomeric materials.

8. The track of claim 1, wherein the non-elastomeric layer is thinner than the given one of the elastomeric layers.

9. The track of claim 1, wherein the non-elastomeric layer includes a first non-elastomeric material and the drive/guide lug comprises a second non-elastomeric material.

10. A track system comprising the track of claim 1 and the plurality of wheels for driving and guiding the track.

11. The track of claim 1, wherein the non-elastomeric layer is generally U-shaped in a cross-section of the drive/guide lug taken in a longitudinal direction of the track.

12. The track of claim 1, wherein the non-elastomeric layer is shaped substantially as a scaled-down version of a periphery of the drive/guide lug.

13. The track of claim 1, wherein the non-elastomeric layer comprises a top portion and a plurality of side portions that extend from the top portion and terminate adjacent to a base of the drive/guide lug.

14. The track of claim 13, wherein the top portion of the non-elastomeric layer extends substantially parallel to a top surface of the drive/guide lug.

15. The track of claim 14, wherein the side portions of the non-elastomeric layer respectively extend substantially parallel to side surfaces of the drive/guide lug.

16. The track of claim 1, wherein the non-elastomeric layer is a first non-elastomeric layer and the drive/guide lug comprises a second non-elastomeric layer entirely contained within the drive/guide lug.

17. A track for traction of a vehicle, the track being mountable around a plurality of wheels for driving and guiding the track around the wheels, the track being elastomeric to flex as the track moves around the wheels, the track comprising:
   an inner surface for facing the wheels;
   a ground-engaging outer surface for engaging the ground; and
   a plurality of drive/guide lugs projecting from the inner surface, each drive/guide lug comprising:
      a plurality of elastomeric layers that includes a plurality of elastomeric materials different from one another; and
      a non-elastomeric layer entirely contained within the drive/guide lug, spaced from a periphery of the drive/guide lug, and comprising a top portion and a plurality of side portions that extend from the top portion, terminate adjacent to a base of the drive/guide lug and contain therebetween a given one of the elastomeric layers that is beneath the non-elastomeric layer.

18. The track of claim 17, wherein the non-elastomeric layer is a polymeric layer.

19. The track of claim 17, wherein a modulus of elasticity of a non-elastomeric material of the non-elastomeric layer is greater than a modulus of elasticity of a given one of the elastomeric materials.

20. The track of claim 17, wherein the non-elastomeric layer reduces a potential for crack propagation in the drive/guide lug.

21. The track of claim 17, wherein a modulus of elasticity of a first one of the elastomeric materials is different from a modulus of elasticity of a second one of the elastomeric materials.

22. The track of claim 21, wherein: the second one of the elastomeric materials is disposed inwardly relative to the first one of the elastomeric materials; and the modulus of elasticity of the second one of the elastomeric materials is greater than the modulus of elasticity of the first one of the elastomeric materials.

23. The track of claim 17, wherein the elastomeric materials comprise at least three elastomeric materials different from one another.

24. The track of claim 17, wherein the non-elastomeric layer is thinner than the given one of the elastomeric layers.

25. The track of claim 17, wherein the non-elastomeric layer comprises a first non-elastomeric material and the drive/guide lug comprises a second non-elastomeric material.

26. A track system comprising the track of claim 17 and the plurality of wheels for driving and guiding the track.

27. The track of claim 17, wherein the non-elastomeric layer is shaped substantially as a scaled-down version of a periphery of the drive/guide lug.

28. The track of claim 27, wherein the top portion of the non-elastomeric layer extends substantially parallel to a top surface of the drive/guide lug.

29. The track of claim 28, wherein the side portions of the non-elastomeric layer respectively extend substantially parallel to side surfaces of the drive/guide lug.

30. A track for traction of a vehicle, the track being mountable around a plurality of wheels for driving and guiding the track around the wheels, the track being elastomeric to flex as the track moves around the wheels, the track comprising:
   an inner surface for facing the wheels;
   a ground-engaging outer surface for engaging the ground; and
   a plurality of drive/guide lugs projecting from the inner surface, each drive/guide lug comprising:
      a plurality of elastomeric layers that includes a plurality of elastomeric materials different from one another; and
      a non-elastomeric layer entirely contained within the drive/guide lug, spaced from a periphery of the drive/guide lug, and shaped substantially as a scaled-down version of the periphery of the drive/guide lug.

31. A track for traction of a vehicle, the track being mountable around a plurality of wheels for driving and guiding the track around the wheels, the track being elastomeric to flex as the track moves around the wheels, the track comprising:
   an inner surface for facing the wheels;
   a ground-engaging outer surface for engaging the ground; and
   a plurality of drive/guide lugs projecting from the inner surface, each drive/guide lug comprising:
      an elastomeric layer; and
      a plurality of non-elastomeric layers, wherein an outermost non-elastomeric layer of the drive/guide lug that is closest to a periphery of the drive/guide lug terminates within the drive/guide lug in a cross-section of the drive/guide lug taken in a longitudinal direction of the track.

\* \* \* \* \*